(12) United States Patent
Eddaoudi et al.

(10) Patent No.: US 9,663,627 B2
(45) Date of Patent: May 30, 2017

(54) AMINE FUNCTIONALIZED POROUS NETWORK

(71) Applicant: KING ABDULLAH UNIVERSITY OF SCIENCE AND TECHNOLOGY, Thuwal (SA)

(72) Inventors: Mohamed Eddaoudi, Thuwal (SA); Vincent Guillerm, Thuwal (SA); Lukasz Weselinski, Thuwal (SA); Mohamed H. Alkordi, Giza (EG); Mohamed Infas Haja Mohideen, Thuwal (SA); Youssef Belmabkhout, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 19 days.

(21) Appl. No.: 14/549,108

(22) Filed: Nov. 20, 2014

(65) Prior Publication Data

US 2015/0148439 A1    May 28, 2015

Related U.S. Application Data

(60) Provisional application No. 61/906,700, filed on Nov. 20, 2013.

(51) Int. Cl.
*C08J 9/36* (2006.01)

(52) U.S. Cl.
CPC ........... *C08J 9/36* (2013.01); *C08J 2201/036* (2013.01)

(58) Field of Classification Search
CPC ... B01D 53/1475; B01D 2257/504; C08J 9/36
See application file for complete search history.

(56) References Cited

U.S. PATENT DOCUMENTS

2013/0047849 A1* 2/2013 Zhang ................... B01D 53/02
                                                          95/130

OTHER PUBLICATIONS

Guillerm, V.; Weselinski, L.J.; Alkordi, M.; Mohideen M.I.H.; Belmabkhout, Y.; Cairns, A.J.; Eddadoudi, M. Porous organic polymers with anchored aldehydes: a new platform for post-synthetic amine functionalization en route for enhanced CO2 adsorption properties. Chem. Commun., 2014, 50, 1937-1940.*
Saya, D.; Sen, R.; Maity, T.; Koner, S. Anchoring of Palladium onto Surface of Porous Metal—Organic Framework through Post-Synthesis Modification and Studies on Suzuki and Stille Coupling Reactions under Heterogeneous Condition.Langmuir 2013, 29, 3140-3151. Published Feb. 2, 2013.*
Machine translation of WO 2010078721 by Lin et al.*
Belmabkhout et al., "Effect of pore expansion and amine functionalization of mesoporous silica on $CO_2$ adsorption over a wide range of conditions," Adsorption (2009) 15: 318-328.
Bonenfant et al., "Advances in principal factors influencing carbon dioxide adsorption on zeolites," Sci. Technol. Adv. Mater. (2008) 9, 013007: 1-7.

(Continued)

*Primary Examiner* — Mike M Dollinger
*Assistant Examiner* — Christina Wales
(74) *Attorney, Agent, or Firm* — Billion & Armitage; Benjamin Armitage

(57) ABSTRACT

Amine groups can be introduced in porous materials by a direct (one pot) or post-synthetic modification (PSM) process on aldehyde groups, and the resulting porous materials have increased gas affinity.

20 Claims, 27 Drawing Sheets

(56) References Cited

OTHER PUBLICATIONS

Dawson et al., "Nanoporous organic polymer networks," Progress in Polymer Science (2012) 37: 530-563.
Demessence et al., "Strong CO2 binding in a water-stable, triazolate-bridged metal-organic framework functionalized with ethylenediamine," J. Am. Chem. Soc. (2009) 131: 8784-8786.
Hwang et al., "Amine grafting on coordinatively unsaturated metal centers of MOFs: Consequences for catalysis and metal encapsulation," Agnew. Chem. Int. Ed. (2008) 47: 4144-4148.
Lu et al., "Polyamine-tethered porous polymer networks for carbon dioxide capture from flue gas," Agnew. Chem. Int. Ed. (2012) 51: 7480-7484.
Morris et al., "Crystals as molecules: Postsynthesis covalent functionalization of zeolitic imidazolate frameworks," J. Am. Chem. Soc. (2008) 130: 12626-12627.
Sayari et al., "Stabilization of amine-containing $CO_2$ adsorbents: dramatic effect of water vapor," J. Am. Chem. Soc. (2010) 132: 6312-6314.
Sjostrom et al., "Evaulation of solid sorbents as a retrofit technology for $CO_2$ capture," Fuel (2010) 89: 1298-1306.
Sumida et al., "Carbon dioxide capture in metal—organic frameworks," Chemical Reviews (2012) 112: 724-781.
Vaidyanathan et al., "Direct observation and quantification of $CO_2$ binding within an amine-functionalized nanoporous solid," Science (Oct. 29, 2010) 330: 650-653.
Zelenak et al, "Amine-modified SBA-12 mesoporous silica for carbon dioxide capture: Effect of amine basicity on sorption properties," Microporous and Mesoporous Materials (2008) 116: 358-364.

* cited by examiner a)

b)

c)

a)

b)

c)

AMINE FUNCTIONALIZED POROUS NETWORK

PRIORITY CLAIM

This application claims priority to U.S. Provisional Application No. 61/906,700, filed Nov. 20, 2013, which is incorporated by reference in its entirety.

FIELD OF THE INVENTION

The invention features functionalized porous networks and methods of making functionalized porous networks.

BACKGROUND

Separation and purification of gases, such as separation and purification of carbon dioxide, are very important. $CO_2$ capture and separations applications have been studied using various types of technologies. Porous materials can efficiently separate $CO_2$ from mixtures of gases.

SUMMARY

In one aspect, a method for enhancing gas affinity of a porous network including a plurality of pores can include functionalizing a molecular building block of a porous network with at least one amine. The amine can include primary amines, secondary amines, tertiary amines, or mixture of at least one of those. The porous network can include a metal-organic framework or a porous organic polymer. The method can include introducing an aldehyde group to the molecular building block. Functionalizing the molecular building block of the porous network can include substituting an aldehyde group with an amine. This can lead to formation of an imine bond.

The porous network can be any polymer or metal organic network having a pore structure. The components of the polymer network can have any degree of polymerization. In certain embodiments, the porous network can include $\{[(C_2)_3-C_6H_3]_2[(CH_3)_3Si-C_6H_2-CHO]_3\}_n$, where n can be greater than one, for example, 1 to 100,000. The amine can include a diamine moiety, which can be an ethylenediamine. The functionalized porous network can includes $\{[(C_2)_3-C_6H_3]_2[(CH_3)_3Si-C_6H_2-CHNC_2H_4NH_2]_3\}_n$, where n is greater than one, for example, 1 to 100,000.

In certain embodiments, the porous network can adsorb $CO_2$. The porous network can adsorb at more $CO_2$ after amine functionalization. For example, the porous network can adsorb at least 5% more gas, at least 20% more gas or at least 50% more gas after amine functionalization.

In certain embodiments, the gas selectivity of the porous network can increase after amine functionalization. The $CO_2$ selectivity of the porous network over other gases can increase after amine functionalization. The $CO_2$ selectivity of the porous network over $N_2$ can increase after amine functionalization. The $CO_2$ selectivity of the porous network over $CH_4$ can increase after amine functionalization. The $CO_2$ selectivity of the porous network over any other gas ($N_2$, $O_2$, $H_2$, acetylene, ethane, butane, propane and other hydrocarbon) can increase after amine functionalization.

In certain embodiments, the method can include soaking or grafting the porous network in a solution containing the amine.

In one aspect, a porous network can include at least one building block including at least one aldehyde group, wherein the aldehyde group can be capable of being functionalized by an amine, and wherein the porous network can have enhanced gas affinity after amine functionalization. In certain embodiments, the aldehyde can be introduced through a reaction with a polyamine.

In certain embodiments, the porous network can include a porous organic polymer or a metal-organic framework. The porous network can include $\{[(C_2)_3-C_6H_3]_2[(CH_3)_3Si-C_6H_2-CHO]_3\}_n$, where n is greater than one, for example, 1 to 100,000. The amine can include a polyamine moiety, for example, a diamine such as ethylenediamine, or any other amine moiety.

Other aspects, embodiments, and features will be apparent from the following description, the drawings, and the claims.

DETAILED DESCRIPTION

Figure 1A:
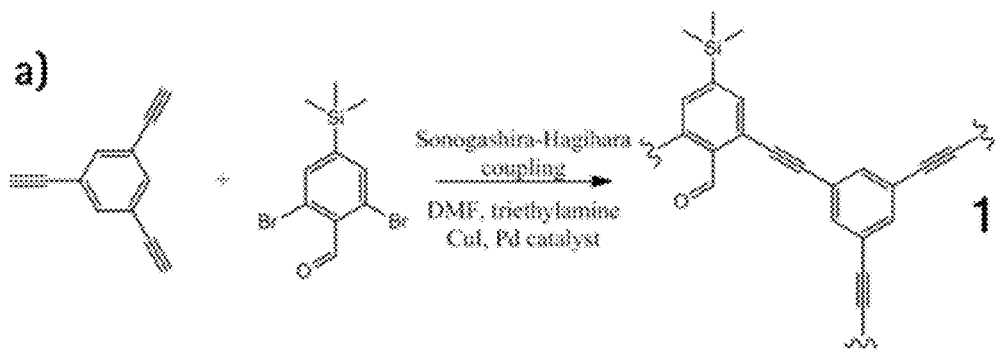
FIG. 1(a) shows a synthetic route to aldehyde containing POP and FIG. 1(b) shows a structural model; one main motif is highlighted; carbon, oxygen, silica, hydrogen are represented in grey, red, yellow and white, respectively.

A porous organic polymer can be synthesized using molecular building blocks containing aldehyde groups. The occurrence of these aldehydes allows a facile and one-step, quantitative, post synthetic amine functionalization procedure. The amine can include at least a primary amine, a secondary amine, a tertiary amine, or a mixture of at least one of those. The functionalized porous polymer can enhance $CO_2$ affinity at low coverage in comparison with the parent material without functionalization in a wide range of $CO_2$ loading. The functionalization can enrich the $CO_2$ selectivity and improve the $CO_2$ removal capabilities from gases, such as $H_2$, $O_2$, hydrocarbons, butane, propane, $N_2$ or $CH_4$ containing gases akin to post-combustion capture and natural gas upgrading applications, and so on.

Separation and purification of gases have a big share in the overall energy consumption map worldwide and it is recognized that separation of carbon dioxide ($CO_2$) from valuable commodities such as methane ($CH_4$) and hydrogen ($H_2$) will keep growing in the next 50 years. See, for example, *Energy Technology Perspectives 2010-Scenarios and Strategies to* 2050, International Energy Agency, OECD Publishing, Paris, 2010, which is incorporated by reference in its entirety. The need to reduce emissions from fossil fuel-fired power plant triggered also an intensive research and development work to separate $CO_2$ from nitrogen ($N_2$) (the major components of flue gas). For these reasons, $CO_2$ capture and separations applications have been pushed into the spotlights and are extensively studied using various types of technologies. The current mature $CO_2$ capture technology is based on alkanolamine solutions, a process that remains costly and energy demanding, mainly because of its high energy intensity required during regeneration of amines in aqueous solution. See, for example, S. Sjostrom and H. Krutka, *Fuel*, 2010, 89, 1298-1306, which is incorporated by reference in its entirety. Amine grafting can be performed on metal sites. See, for example, Y. Belmabkhout and A. Sayari, *Adsorption-Journal of the International Adsorption Society*, 2009, 15, 318-328; R. Vaidhyanathan, S. S. Iremonger, G. K. H. Shimizu, P. G. Boyd, S. Alavi and T. K. Woo, *Science*, 2010, 330, 650-653; W. Morris, C. J. Doonan, H. Furukawa, R. Banerjee and O. M. Yaghi, *Journal of the American Chemical Society*, 2008, 130, 12626-+.; Y. K. Hwang, D. Y. Hong, J. S. Chang, S. H. 0, Y. K. Seo, J. Kim, A. Vimont, M. Daturi, C. Serre and G. Ferey, *Angewandte Chemie-International Edition*, 2008, 47, 4144-4148, each of which is incorporated by reference in its entirety.

To reduce energy expense, one way is to use solid porous materials, such as zeolites, metal-organic frameworks (MOFs) or silica/carbon based adsorbents, as a support (host) for amines. The approach targeting selective $CO_2$ adsorption at relatively low pressures within microporous/mesoporous solids strengthened by accessible amine groups can be a suitable alternative solution with regards to $CO_2$ capture challenges. See, for example, D. Bonenfant, M. Kharoune, P. Niquette, M. Mimeault and R. Hausler, *Sci. Tech. Adv. Mat.*, 2008, 9, 013007; K. Sumida, D. L. Rogow, J. A. Mason, T. M. McDonald, E. D. Bloch, Z. R. Herm, T.-H. Bae and J. R. Long, *Chem. Rev.*, 2012, 112, 724-781; R. Dawson, A. I. Cooper and D. J. Adams, *Prog. Polym. Sci.*, 2012, 37, 530-563; A. Sayari and Y. Belmabkhout, *J. Am. Chem. Soc.*, 2010, 132, 6312-6314; V. Zelenak, D. Halamova, L. Gaberova, E. Bloch and P. Llewellyn, *Mic. Mes. Mat.*, 2008, 116, 358-364; Y. Belmabkhout, R. Serna-Guerrero and A. Sayari, *Chem. Eng. Sci.*, 2010, 65, 3695-3698; A. Sayari, Y. Belmabkhout and E. Da'na, Langmuir, 2012, 28, 4241-4247; A. Sayari, Y. Belmabkhout and R. Serna-Guerrero, *Chem. Eng. J.*, 2011, 171, 760-774, each of which is incorporated by reference in its entirety. This approach allows separating $CO_2$ from dry as well as humid $N_2$, $O_2$, $CH_4$ and $H_2$ containing streams with high selectivity and without the drawbacks associated to liquid amine approach.

An emerging class of materials, a porous network constructed from the assembly of molecular building blocks (MBBs) is currently gaining momentum as potential gas adsorbents. A porous network can include Porous Organic Polymer (POP), Covalent-Organic Framework (COF), Porous Aromatic Framework (PAF), Porous Polymer Network (PPN), Conjugated Microporous Polymers (CMP), Microporous Polymer Network (MPN), Polymer with Intrinsic Microporosity (PIM), Hyper Crossed-linked Polymer (HCP), Metal-organic Framework (MOF), Coordination Polymers (CP), Porous Coordination Polymers (PCP), Porous Coordination Networks (PCN), or Metal-Organic Materials (MOM), or a mixture thereof. POP, PAF, COF, PPN, CMP, MPN, PIM, HCP are below all included in the term porous organic polymer (POP); MOF, CP, PCP, PCN, MOM are below all included in the term metal-organic framework (MOF). They are promising due to their intrinsic properties: high porosity up to 6000 $m^2.g^{-1}$, high chemical and thermal stability, structural and functional tunability, etc. Specific topologies can be targeted through the careful choice of MBBs and synthetic conditions to afford crystalline materials, but such a control of topology and crystallinity is not mandatory for the control of porosity in POPs. See, for example, D. Yuan, W. Lu, D. Zhao and H.-C. Zhou, *Adv. Mater.*, 2011, 23, 3723-3725; T. Ben, C. Pei, D. Zhang, J. Xu, F. Deng, X. Jing and S. Qiu, *Energy Envir. Sci.*, 2011, 4, 3991-3999; A. P. Cote, A. I. Benin, N. W. Ockwig, M. O'Keeffe, A. J. Matzger and O. M. Yaghi, *Science*, 2005, 310, 1166-1170; N. B. McKeown, S. Makhseed and P. M. Budd, *Chem. Commun.*, 2002, 2780-2781; J. Jia-Xing, S. Fabing, A. Trewin, C. D. Wood, N. L. Campbell, N. Hongjun, C. Dickinson, A. Y. Ganin, M. J. Rosseinsky, Y. Z. Khimyak and A. I. Cooper, *Angew. Chem. Int. Ed.*, 2007, 46, 8574-8578, each of which is incorporated by reference in its entirety.

One parameter to achieve efficient $CO_2$ capture is the ability to tune an existing platform with accessible groups that will show strong affinity toward $CO_2$ without affecting much the porosity.

With regard to $CO_2$ capture and separation, recent works developed on MOFs showed $CO_2$ sorption uptakes, energetics and selectivity, through the grafting of amines on unsatu rated metal sites (UMS). See, for example, A. Demessence, D. M. D'Alessandro, M. L. Foo and J. R. Long, *J. Am. Chem. Soc.,* 2009, 131, 8784-8786; T. M. McDonald, W. R. Lee, J. A. Mason, B. M. Wiers, C. S. Hong and J. R. Long, *J. Am. Chem. Soc.,* 2012, 134, 7056-7065; S. Choi, T. Watanabe, T. H. Bae, D. S. Sholl and C. W. Jones, *J. Phys. Chem. Lett.,* 2012, 3, 1136-1141, each of which is incorporated by reference in its entirety. POPs can be a suitable support for amine grafting, using a two steps post-synthetic modification (PSM) requiring harsh chemical treatments. See, for example, W. Lu, J. P. Sculley, D. Yuan, R. Krishna, Z. Wei and H.-C. Zhou, *Angew. Chem. Int. Ed.,* 2012, 51, 7480-7484, which is incorporated by reference in its entirety.

In another method, accessible aldehydes can be introduced directly in the MBB, to allow in fine their gentle one step post-synthetic substitution by amines.

Aldehyde groups can be utilized for the formation of POPs, particularly in combination with amines or hydrazides, affording the formation of imines or hydrazones groups as links between the different MBBs. See, for example, F. J. Uribe-Romo, C. J. Doonan, H. Furukawa, K. Oisaki and O. M. Yaghi, *J. Am. Chem. Soc.,* 2011, 133, 11478-11481; F. J. Uribe-Romo, J. R. Hunt, H. Furukawa, C. Klock, M. O'Keeffe and O. M. Yaghi, *J. Am. Chem. Soc.,* 2009, 131, 4570-4571, each of which is incorporated by reference in its entirety.

Free aldehydes can be introduced in the POP structure, and a POP can be produced from Sonogashira-Hagihara coupling (SH). Utilizing halogenated, such as brominated, molecular building blocks and alkynes, aldehyde groups should not be affected during the synthesis, and will remain intact in the material for further post-synthetic amine functionalization.

Active amine groups can be introduced in porous materials such as organic polymer networks, or metal organic frameworks (MOFs) by a direct (one pot) or post-synthetic modification (PSM) process on aldehyde groups. Any material, crystalline or amorphous, likely porous, containing aldehyde groups, or tunable by aldehyde groups can potentially be used. Any polyamine can potentially be used, pure or in mixture with other amines or chemicals, in direct synthesis or post-synthesis modification.

For direct synthesis, the direct reaction of polyamines (ethylenediamine, 1,3-diaminopropane, etc) with polyaldehydes (glyoxal, glutaraldehyde, terephthaldehyde, etc.) in presence of other chemicals (solvents, templates, etc.) can lead, depending on the aldehyde/amine ratio, to material with exposed amines (excess of amine groups), either free aldehydes (excess of aldehydes groups) that can be further functionalized. Such materials made from amines and aldehydes can be crystalline and porous.

For post-synthetic modification, various amine grafting conditions can potentially be used, from soaking the aldehyde containing material in the pure amine solution at high temperature, to room temperature grafting in diluted solution of amines in solvent such as, but not limited to, tetrahydrofuran (THF), toluene, hexane, etc.

Figure 1B:
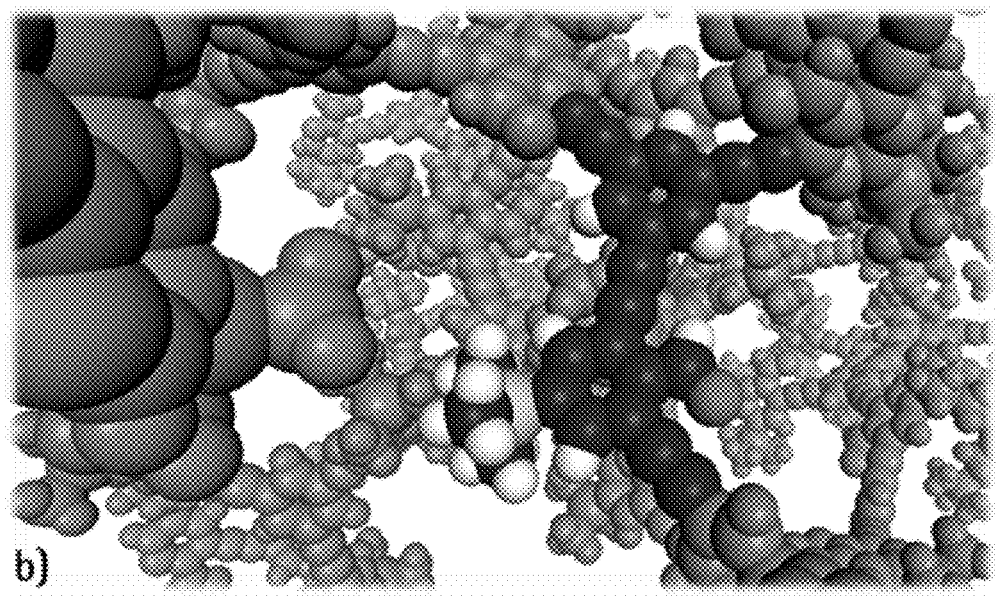

Aldehyde can be introduced directly on the molecular building blocks used for the synthesis of the material (FIG. 1), but can also be introduced in material that initially does not contain aldehyde groups, and followed by an amine grafting method (scheme 1).

Scheme 1: Possible ways to introduce free amines in a material that initially does not contain aldehyde groups, in POPs or MOFs.

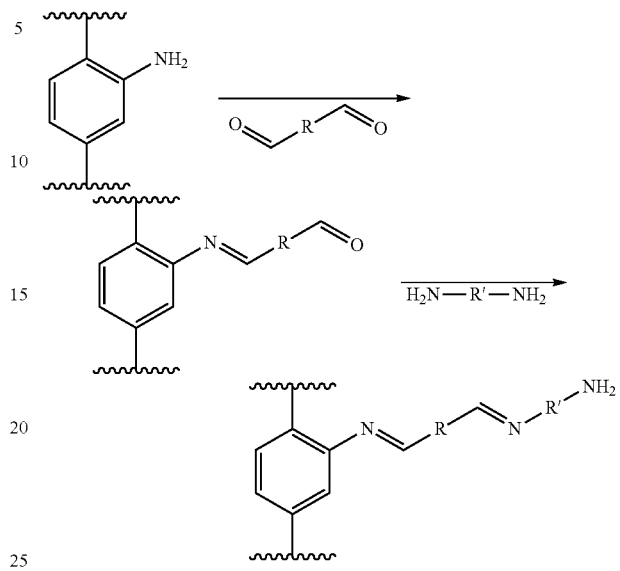

Scheme 2: Possible way to graft various amine containing substituent on an aldehyde group in POPs or MOFs.

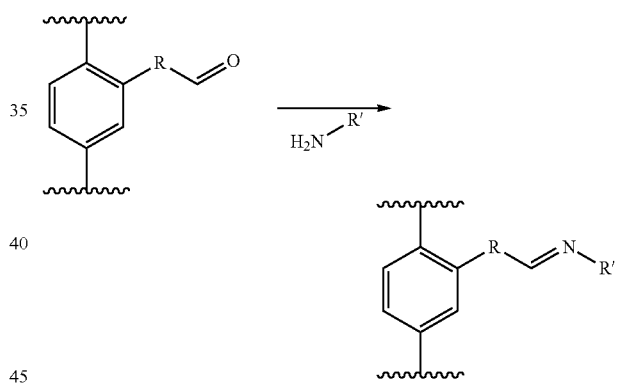

R = can be nothing (just a bond) or any organic moiety (alkyl, etc.)
R' = any moiety containing at least one primary, secondary or tertiary amine, or mixture of at least two of them. It can be branched with unlimitted number of any kind of amines

EXAMPLE

Experimental Methods

Synthetic reactions were performed under argon atmosphere in oven-dried glassware. All reagents were obtained from commercial vendors and used as received, unless otherwise stated. Tetrahydrofuran (THF, ReagentPlus®, >99%, Sigma-Aldrich) was freshly distilled over $LiAlH_4$. Anhydrous N,N-dimethylformamide, (DMF, 99.8%, Sigma Aldrich) was stored over $CaH_2$. Other reagents: 1,3-dibromo-5-trimethylsilylbenzene, (>97%, TCI Japan); solution of lithium diisopropylamide (LDA, 2M in tetrahydrofuran/heptane/ethylbenzene, Sigma Aldrich); 1,3,5-triethynylbenzene, (TEB, 98%, Alfa Aesar); copper(I) iodide (CuI, 98%, Acros Organics); bis(triphenylphosphine)palladium(II) dichloride, (98%, Sigma Aldrich); triethylamine (Chromanorm®, HPLC grade, VWR); methanol (MeOH, HPLC grade, Fisher); absolute ethanol (EtOH, HPLC grade, Sigma Aldrich); ethylenediamine, (EDA, 99%, Acros Organics).

Preparation of 2,6-dibromo-4-trimethylsilylbenzaldehyde. See, for example, S. Luliński and J. Serwatowski, *J. Org. Chem.*, 2003, 68, 5384-5387, which is incorporated by reference in its entirety. Under argon atmosphere, the mixture of 1,3-dibromo-5-trimethylsilylbenzene (10 mmol, 3.08 g, 1 eq.) in dry THF (20 ml) was cooled to −70° C., and 2 M solution of LDA (12 mmol, 6 ml, 1.2 eq.) was added dropwise for 30 min and the mixture was stirred for 30 min at the same temperature. Dry DMF (12 mmol, 1 ml, 1.2 eq.) was then added dropwise for 5 min, and stirring was continued for 30 min at the same temperature. Then, to the cold mixture a diluted sulfuric acid was added (2 drops of conc. acid in 60 ml of water). The mixture was subsequently diluted with 50 ml of diethyl ether and the phases were separated. The water phase was further extracted with 30 ml of diethyl ether and the combined organic extracts were dried with $Na_2SO_4$. The reaction mixture was then filtered and concentrated using rotary evaporator. Residual oil was subjected to column chromatography (100% hexane to 95:5 hexane: EtOAc) to give 2.93 g (85%) of the yellow oil, that solidified upon standing. Rf=0.5 (95:5 Hexane: EtOAc). $^1$H NMR ($CDCl_3$, 400 MHz): δ=10.2 (1H, s, CHO), 7.70 (2H, s, HO, 0.31 (9H, s, TMS) ppm, which is in agreement with the reported data. See, for example, US Pat., US2005/124596 A1, 2005, which is incorporated by reference in its entirety. $^{13}$C NMR ($CDCl_3$, 100 MHz): δ=191.4 (CHO), 150.5 (C4), 138.1 (C3), 132.7 (C1), 124.8 (C2), −1.420 (TMS) ppm.

Preparation of $\{[(C_2)_3-C_6H_3]_2[(CH_3)_3Si-C_6H_2-CHO]_3\}_n$ (1) A mixture of dry DMF/triethylamine (4:1, 25 mL) in a round-bottom flask (100 mL), sealed with septum, was evacuated/backfilled three times, then bubbled with argon for 30 min. Then 2,6-dibromo-4-trimethylsilylbenzaldehyde (3 mmol, 1 g, 1 eq.), 1,3,5-triethynylbenzene (3 mmol, 450 mg, 1 eq.), bis(triphenylphosphine)palladium(II) dichloride (0.142 mmol, 100 mg, 0.048 eq.) and CuI (0.22 mmol, 42 mg, 0.075 eq.) were added together, the flask was then evacuated/backfilled with argon and the mixture was stirred at 80° C. for 29 h. Dark precipitate formation was observed. The mixture was diluted with methanol, filtered, and then the solid was thoroughly washed with chloroform, water, methanol and acetone. It was further purified by refluxing in ethanol for 24 h to remove any residual starting material. The product was briefly dried at suction, then under high vacuum at 50° C. overnight to yield 1.2 g of brown solid. Elemental Analysis for calculated formula $C_{54}H_{42}O_3Si_3$: C=70.02% (calc.: 78.79%), H=5.50% (5.14%), N=0.68% (0.0%).

Preparation $\{[(C_2)_3-C_6H_3]_2 [(CH_3)_3Si-C_6H_2-CHNC_2H_4NH_2]_3\}_n$ (2) A resealable flask was charged with 50 mg of 1 and 10 mL of EDA and heated at 85° C. for 72 h. The resulting dark brown solid was collected by filtration and exchanged for 3 days in MeOH, refreshing MeOH at least once every 24 hours. Elemental Analysis for calculated formula $C_{60}H_{60}N_6Si_3$: C=65.72% (calc.: 75.90%), H=6.11% (6.37%), N=7.91% (8.85%).

The observed differences/discrepancies between calculated and experimental values for 1 and 2 are typical for that kind of materials due to the presence of unreacted halogen functionalities and other residual impurities, as previously demonstrated by Cooper and coworkers. See, for example, J. Jia-Xing, S. Fabing, A. Trewin, C. D. Wood, N. L. Campbell, N. Hongjun, C. Dickinson, A. Y. Ganin, M. J. Rosseinsky, Y. Z. Khimyak and A. I. Cooper, *Angew. Chem. Int. Ed.*, 2007, 46, 8574-8578, which is incorporated by reference in its entirety.

Synthesis of Amine Grafted Aldehyde-POP

The amine grafting of aldehyde-POP (aldehyde substitution) can be achieved via one step PSM grafting and using three different amine Ethylenediamine (EDA), Diethylenetriamine(DETA), and Tris(2-aminoethyl)amine (Tris-amine). To study the effect of reaction conditions, the grafting reactions with different amines were taken at four different temperatures including: 25° C. (room temperature), 85° C., 105° C., and 115° C. The experimental procedure is as following; 100 mg of compound (1) was soaked with 10 ml of a given amine for 24 hours. Then, the products were collected by filtration and exchanged within absolute EtOH for 2 days. Elemental Analysis data with calculated formula for each different amine grafted product are presented hereafter:

EDA-Aldehyde POP $\{[(C_2)_3-C_6H_3]_2[C_6H_3-CHNC_2H_4NH_2]_3\}_n$ $C_{51}H_{36}N_6$: C=66.9%(cal. 83%), H=4.6%(cal. 4.9%), N=8.4%(cal. 11%) DETA-Aldehyde POP $\{[(C_2)_3-C_6H_3]_2[C_6H_3-CHN (CH_2)_2NH(CH_2)_2 NH_2]_3\}_n$ $C_{57}H_{45}N_9$: C=66.6%(cal. 80%), H=5%(cal. 5.3%), N=10%(cal. 14%) Tris-amine-Aldehyde POP $\{[(C_2)_3-C_6H_3]_2[C_6H_3-CHN(CH_2)_2N(CH_2)_4(NH_2)_2]_3\}_n$ $C_{63}H_{66}N_{12}$: C=66%(cal. 70%), H=5.5%(cal. 6%), N=10.9% (cal. 23%)

Scheme (3): Synthesis of EDA-Aldehyde POP

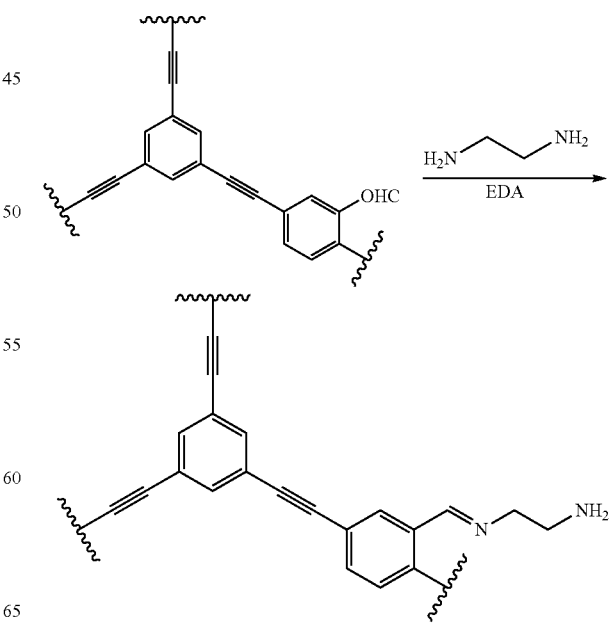

Scheme (4): Synthesis of DETA-Aldehyde POP
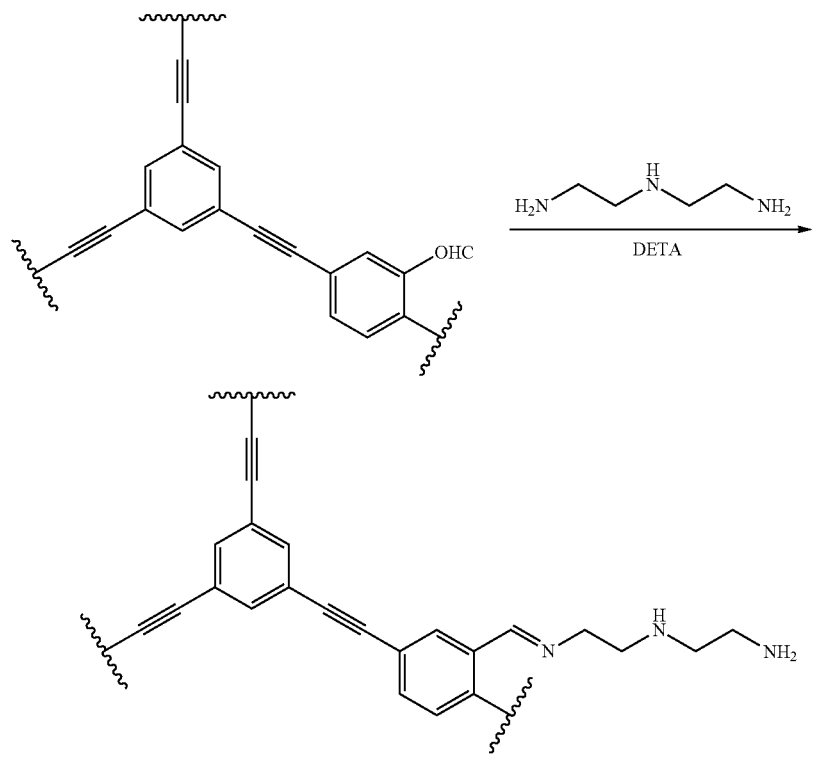
Scheme (5): Synthesis of Tris-Aldehyde POP
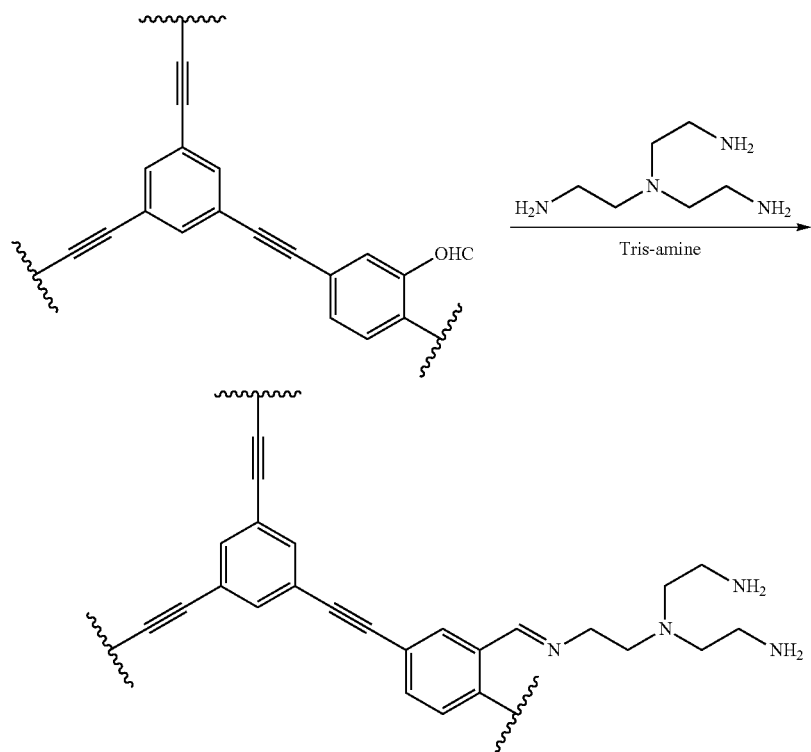

Instrumentation

Thermogravimetric analysis (TGA) measurements were performed on a TA Q500 apparatus, under air atmosphere (flow=25 cm$^3$.min$^{-1}$, heating rate 5° C.min$^{-1}$).

Fourier-transform Infrared (FT-IR) spectra (4000-600 cm$^{-1}$) were recorded on a Thermo Scientific Nicolet 6700 apparatus. The peak intensities are described in each of the spectra as very strong (vs), strong (s), medium (m), weak (w) and broad (br).

Low-pressure gas sorption measurements were performed on a fully automated Autosorb 6B (for $N_2$ sorption screening) and Autosorb-iQ gas adsorption analyzer, (Quantachrome Instruments) at relative pressures up to 1 atm. The cryogenic temperatures were controlled using liquid nitrogen and argon baths at 77 K and 87 K, respectively. The bath temperature for the $CO_2$ sorption measurements was controlled using an ethylene glycol/$H_2O$ re-circulating bath.

NMR spectra were recorded at room temperature with Bruker Avance 400 MHz spectrometer using $CDCl_3$ as a solvent.

Elemental analysis was performed with a Thermo Scientific Flash 2000 instrument.

Thermogravimetric analysis. Materials 1 and 2 have been dried at 50° C. for one hour prior to perform TGA measurements. 1 and 2 show similar thermal behavior. They are stable up to ca. 300° C. and 250° C. respectively, and the structures slowly start decomposing at higher temperature. The weight loss occurring at 30° C. observed for 2 is attributed to solvent/water coordinated to the free amines through hydrogen bonding. Slower degradation of 2, occurring at lower temperature is attributed to the progressive departure of grafted amine. Residual weight is attributed to $SiO_2$ formed from the degradation of TMS moieties under air.

Infrared spectroscopy. IR measurements performed on 1 show the presence of both building blocks in the material, with the characteristic $v_{C=O}$ band (1700 cm$^{-1}$) attributed to the aldehyde group for TMSBA moieties and signal corresponding to $v_{C\equiv C}$ bond (2160 cm$^{-1}$) for TEB moieties. Absence of the $v_{C=O}$ band from aldehydes in 2 indicates efficiency of the substitution of the aldehyde, also confirmed by the presence of the $v_{C=N}$ band (1628 cm$^{-1}$). Despite the presence of a broad band (3500-3000 cm$^{-1}$) due to hydrogen bonding in 2, it is possible to assign two bands from $v_{N-H}$ (3354 and 3287 cm$^{-1}$).

IR values for 1 (cm$^{-1}$): 3500-3000(br), 2949(m), 2892(m), 2160(w), 1700(s), 1576(s), 1411(m), 1242(s), 1215(w), 1077(m), 1084(s), 972(w), 870(m), 832(vs), 750(m).

IR values for 2 (cm$^{-1}$): 3500-3000(br), 3354(w), 3287(w), 3021(w), 2945(m), 2862(m), 2168(w), 1628(m), 1583(s), 1492(m), 1444(w), 1312(w), 1247(s), 1140(w), 829(vs), 750(m), 726(s), 691(s).

Figure 2:
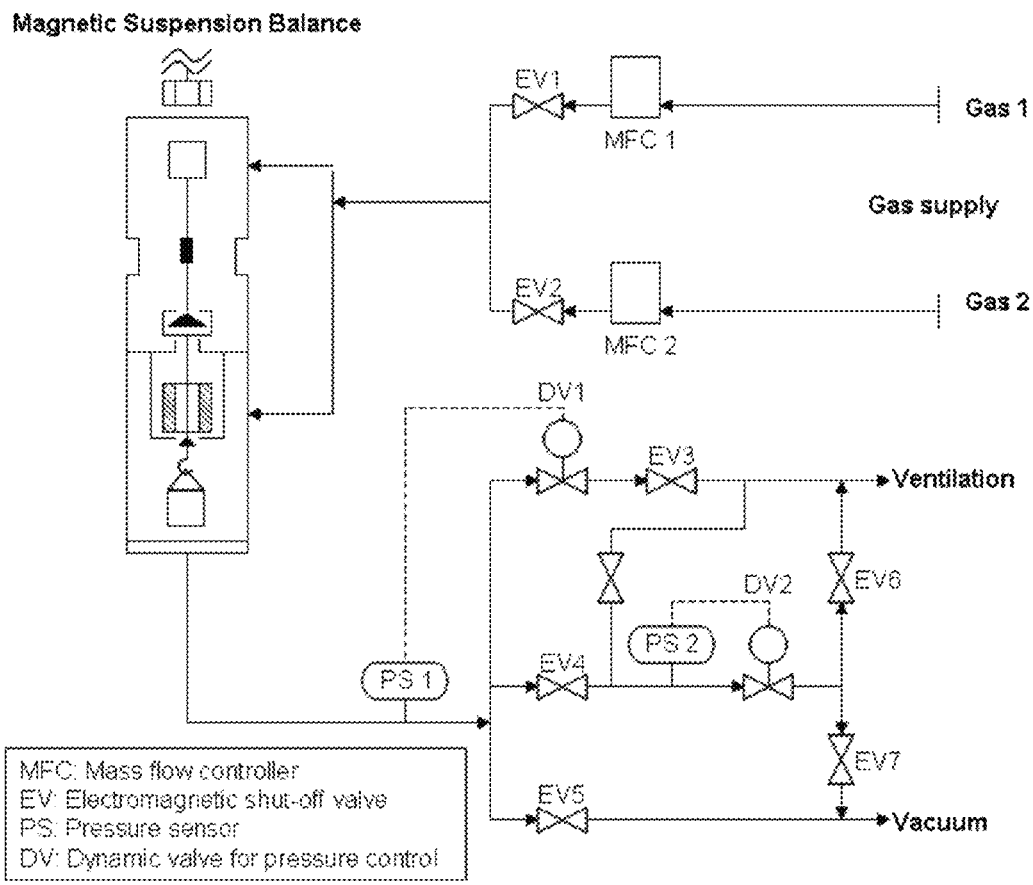
FIG. 2 shows a schematic representation of the Rubotherm gravimetric-densimetric apparatus.

High pressure adsorption isotherms of $CO_2$, $CH_4$, $N_2$, $H_2$: Adsorption equilibrium measurements of pure gases were performed using a Rubotherm gravimetric-densimetric apparatus (Bochum, Germany) (FIG. 2), composed mainly of a magnetic suspension balance (MSB) and a network of valves, mass flowmeters and temperature and pressure sensors. The MSB overcomes the disadvantages of other commercially available gravimetric instruments by separating the sensitive microbalance from the sample and the measuring atmosphere and is able to perform adsorption measurements across a wide pressure range, i.e. from 0 to 20 MPa. The adsorption temperature may also be controlled within the range of 77 K to 423 K. In a typical adsorption experiment, the adsorbent is precisely weighed and placed in a basket suspended by a permanent magnet through an electromagnet. The cell in which the basket is housed is then closed and vacuum or high pressure is applied. The gravimetric method allows the direct measurement of the reduced gas adsorbed amount $\Omega$. Correction for the buoyancy effect is required to determine the excess and absolute adsorbed amount using equation 1 and 2, where $V_{adsorbent}$ and $V_{ss}$ and $V_{adsorbed\ phase}$ refer to the volume of the adsorbent, the volume of the suspension system and the volume of the adsorbed phase, respectively.

$$\Omega = m_{absolute} - \rho_{gas}(V_{adsorbent} + V_{ss} + V_{adsorbed\text{-}phase}) \tag{1}$$

$$\Omega = m_{excess} - \rho_{gas}(V_{adsorbent} + V_{ss}) \tag{2}$$

The buoyancy effect resulted from the adsorbed phase maybe taken into account via correlation with the pore volume or with the theoretical density of the sample.

These volumes are determined using the helium isotherm method by assuming that helium penetrates in all open pores of the materials without being adsorbed. The density of the gas is determined using Refprop equation of state (EOS) database and checked experimentally using a volume-calibrated titanium cylinder. By weighing this calibrated volume in the gas atmosphere, the local density of the gas is also determined. Simultaneous measurement of adsorption capacity and gas phase density as a function of pressure and temperature is therefore possible.

The pressure is measured using two Drucks high pressure transmitters ranging from 0.5 to 34 bar and 1 to 200 bar, respectively, and one low pressure transmitter ranging from 0 to 1 bar. Prior to each adsorption experiment, about 200 mg of sample is outgassed at 473 K at a residual pressure 10$^{-6}$ mbar. The temperature during adsorption measurements is held constant by using a thermostated circulating fluid.

Toth Model for Single Gas Adsorption Fitting: The Toth model was used to fit the pure gas isotherms because of its suitable behavior at both low and high pressure and its simple formulation as expressed by equation 3. See, for example, J. Toth, Uniform and thermodynamically consistent interpretation of adsorption isotherms, 2002, which is incorporated by reference in its entirety.

$$n = n_s \frac{KP}{(1 + (KP)^m)^{1/m}} \tag{3}$$

where n is the amount adsorbed, $n_s$ is the amount adsorbed at saturation, P is the equilibrium pressure, K is the equilibrium constant, and m is a parameter indicating the heterogeneity of the adsorbent.

Prediction of multicomponent gas adsorption Ideal Adsorption Solution Theory (IAST): The Ideal Adsorption Solution Theory (IAST) proposed by Mayer and Prausnitz uses pure gases adsorption isotherms to predict the mixture adsorption equilibrium at the temperature of interest. See, for example, A. L. Myers and J. M. Prausnitz, AIChE J 1965, 11, 121-127, which is incorporated by reference in its entirety. For IAST application, the main condition to be fulfilled is the availability of (i) good quality single component adsorption data of different gases, and (ii) excellent curve fitting model for such data. See, for example, Y.-S. Bae, K. L. Mulfort, H. Frost, P. Ryan, S. Punnathanam, L. J. Broadbelt, J. T. Hupp and R. Q. Snurr, Langmuir, 2008, 24, 8592-8598; H. Chen and D. S. Sholl, Langmuir, 2007, 23, 6431-6437, which is incorporated by reference in its entirety. In the current work, MSL and DSL models was used to fit the pure gas isotherms as mentioned earlier The most important equations used in the IAST calculation are listed hereafter:

$$f_i = x_i f_i^0(\pi) \tag{4}$$

$$\frac{\pi A}{RT} = \int_0^{f_i^0} n_i d\ln f_i \tag{5}$$

$$\frac{1}{n_t} = \sum_i \frac{x_i}{n_i^0} \tag{6}$$

$$S_{CO_2-i} = \frac{x_{CO_2}/x_i}{y_{CO_2}/y_i} \tag{7}$$

where $f_i$ is the fugacity of component i in the gas phase; $f_i^0$ is the standard-state fugacity, i.e. the fugacity of pure component i at the equilibrium spreading pressure of the mixture, $\pi$; $x_i$ and $y_i$ are the mole fractions of component i in the adsorbed and gas phase, respectively; A is the surface area of the adsorbent, $n_i$ is the number of moles adsorbed of pure component i (i.e., the pure-component isotherm), and $n_i^0$ is the number of moles adsorbed of pure component i at the standard-state pressure Equation 4 is the central equation of IAST, specifying the equality of the chemical potential of component i in the gas and the adsorbed phase (which is assumed to be ideal in the sense of Raoult's law). Equation 5 allows the calculation of the spreading pressure from the pure-component adsorption isotherm. The total amount adsorbed of the mixture, $n_t$ and the selectivity of $CO_2$ with respect to i, $S_{CO_2-i}$ are given by equations 6 and 7, respectively. The selectivity $S_{co_2-i}$ reflects the efficiency of $CO_2$ separation.

A post-synthetic amine functionalization strategy can be developed for the grafting of amines in porous materials decorated with accessible aldehyde nodes. Substitution of aldehyde groups by EDA can lead to an increase of Qst (from 33 to 50 kJ.mol$^{-1}$), which can be characteristic of enhanced interactions between gas and the porous materials, as well as higher qualitatively $CO_2/N_2$ and $CO_2/CH_4$ selectivities in comparison with the parent material. This strategy is not limited to organic materials, but can also be applied to MOFs containing aldehyde groups. Regeneration of the material does not require heating, which can be important for the next generation of separation agents.

Figure 3:
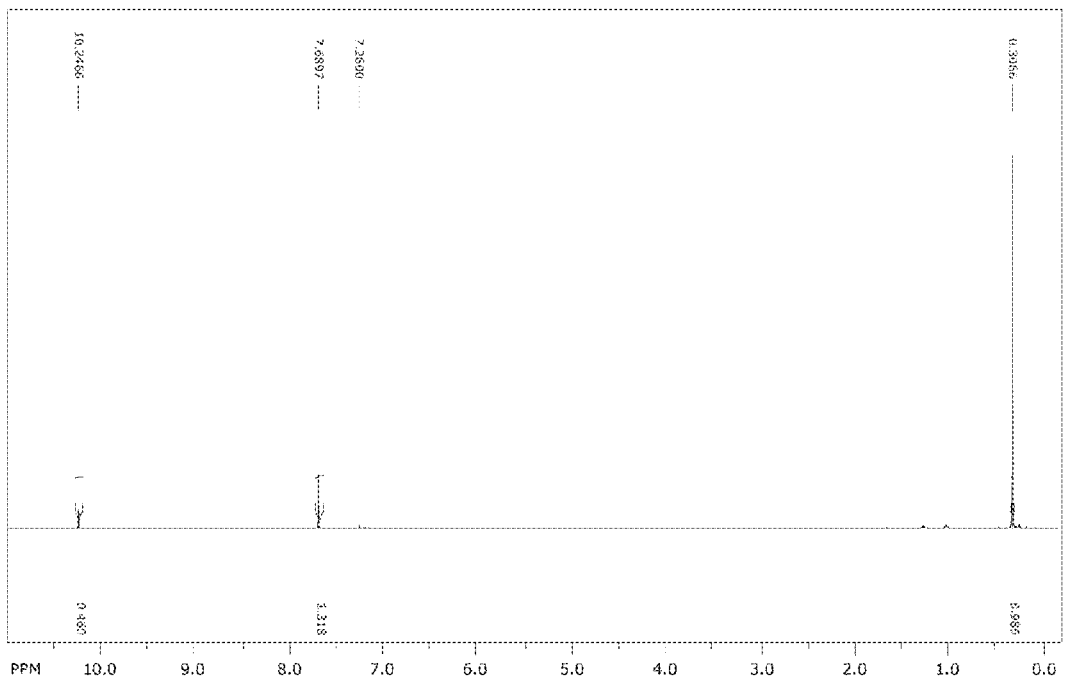
FIG. 3 shows $^1H$ NMR spectrum of 2,6-dibromo-4-trimethylsilylbenzaldehyde ($CDCl_3$, 400 MHz).
Figure 4:
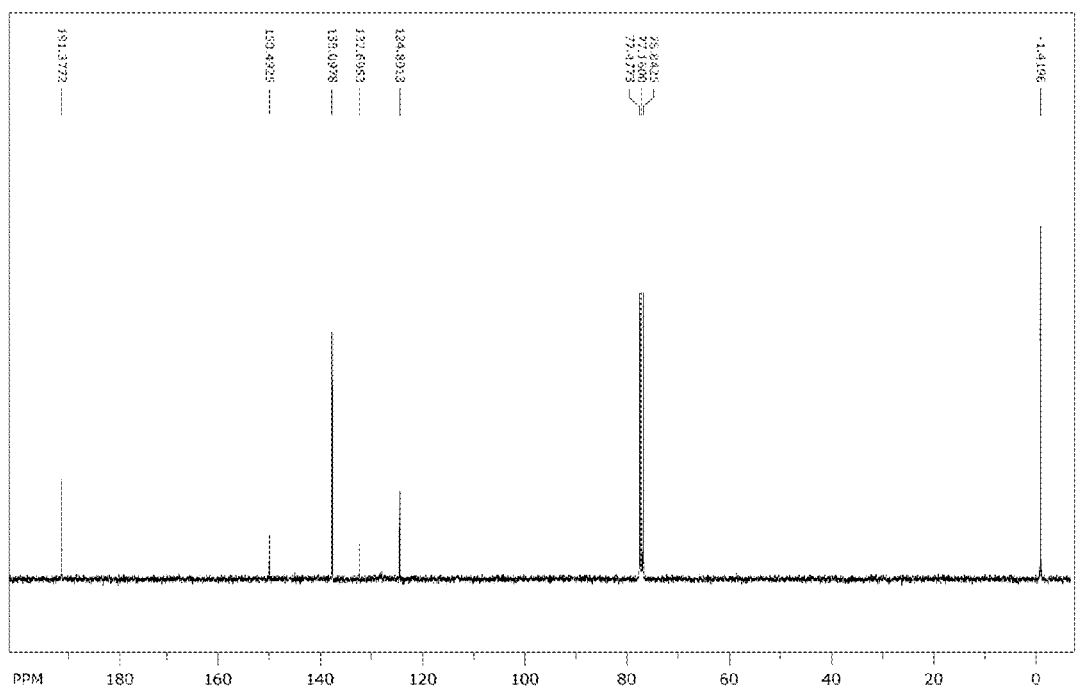
FIG. 4 shows $^{13}C$ NMR spectrum of 2,6-dibromo-4-trimethylsilylbenzaldehyde ($CDCl_3$, 100 MHz).

Two MBBs can be used to afford a $\{[(C_2)_3—C_6H_3]_2[(CH_3)_3Si—C_6H_2—CHO]_3\}_n$ POP (1). 1,3,5-triethynylbenzene (TEB) can act as a 3-connected secondary building unit (SBU) when 2,6-dibromo-4-trimethylsilylbenzaldehyde ($Br_2$TMSBA) is a bent, 2-connected SBU. These two MBBs are assembled together by SH coupling to form 1. FIG. 3 and FIG. 4 show NMR spectra of 2,6-dibromo-4-trimethylsilylbenzaldehyde. Synthesis of 1 is followed by a 24 h solvent exchange in refluxing ethanol (EtOH) to remove all traces of unreacted starting materials, catalysts or less volatile solvents.

Figure 5:
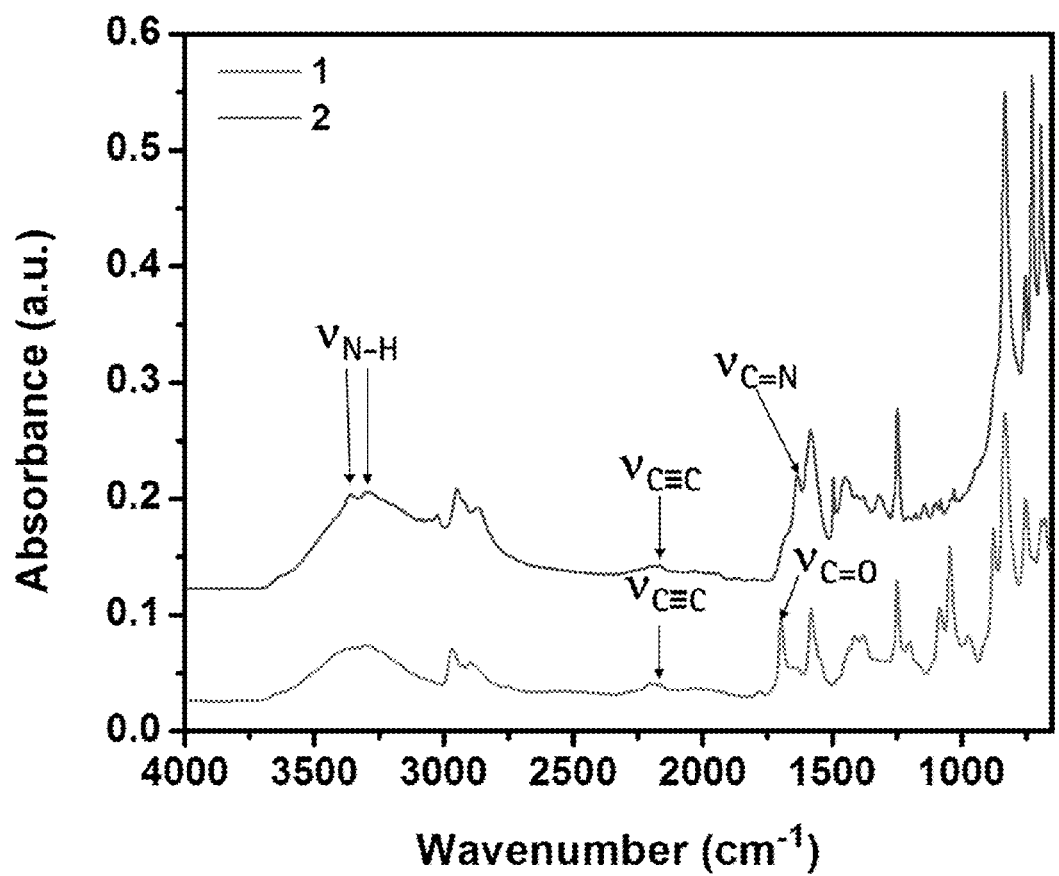
FIG. 5 shows FT-IR spectra for 1 and 2.
Figure 6:
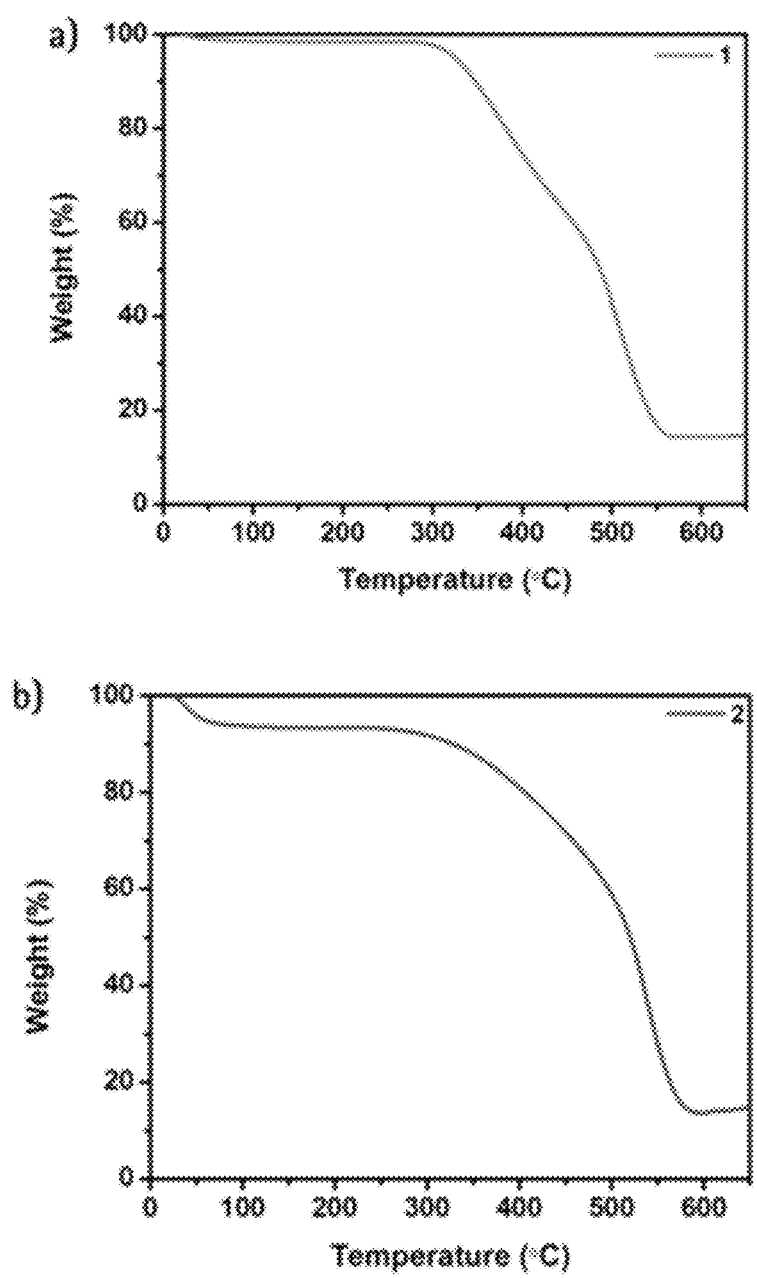
FIG. 6 shows TGA of a) 1 and b) 2.

Unlike POPs obtained by condensation reactions, POPs formed through SH coupling are widely amorphous, making their characterization challenging. However, crystallinity is not a requirement to obtain porous materials; Cooper and co-workers contributed significantly to the field, explaining in details parameters that govern the formation and pore size control in amorphous POPs. See, for example, J.-X. Jiang, F. Su, A. Trewin, C. D. Wood, H. Niu, J. T. A. Jones, Y. Z. Khimyak and A. I. Cooper, *J. Am. Chem. Soc.*, 2008, 130, 7710-7720, which is incorporated by reference in its entirety. Nevertheless, presence of both MBBs in 1 is confirmed by Fourier-transformed infrared (FTIR) spectroscopy, with the characteristic $v_{C=O}$ band (1700 cm$^{-1}$) attributed to the aldehyde group for TMSBA moieties and signal corresponding to C≡C bond (2160 cm$^{-1}$) for TEB moieties (FIG. 5). Thermogravimetric analysis performed on 1 after EtOH exchange shows its high thermal stability up to ca. 300° C. (FIG. 6(a)).

Nitrogen sorption performed on 1 at 77 K showed Type IV isotherm with desorption hysteresis that might be due to a certain swelling behaviour, commonly observed in these type of structures (FIG. 7(a)). See, for example, C. D. Wood, B. Tan, A. Trewin, F. Su, M. J. Rosseinsky, D. Bradshaw, Y. Sun, L. Zhou and A. I. Cooper, *Adv. Mater.*, 2008, 20, 1916-1921, which is incorporated by reference in its entirety. Brunauer-Emmett-Teller (BET), Langmuir surface areas and total pore volume are 630 m$^2$.g$^{-1}$, 730 m$^2$.g$^{-1}$ and 0.54 cm$^3$.g$^{-1}$, respectively.

Aldehydes can be introduced on purpose directly in the MBB of 1, to allow amine grafting (aldehyde substitution) by PSM process. This substitution can be performed through a one-step PSM process performed under mild conditions. 1 is soaked in ethylenediamine (EDA) at 85° C. for three days to afford $\{[(C_2)_3—C_6H_3]_2[(CH_3)_3Si—C_6H_2—CHNC_2H_4NH_2]_3\}$. (2), isolated by filtration. No obvious colour change was observed, and the grafting efficiency is confirmed by FTIR spectrum. Characteristic band of $v_{C=O}$ from the aldehyde present in 1 at 1700 cm$^{-1}$ is no longer visible in 2 (FIG. 5).

Figure 8B:
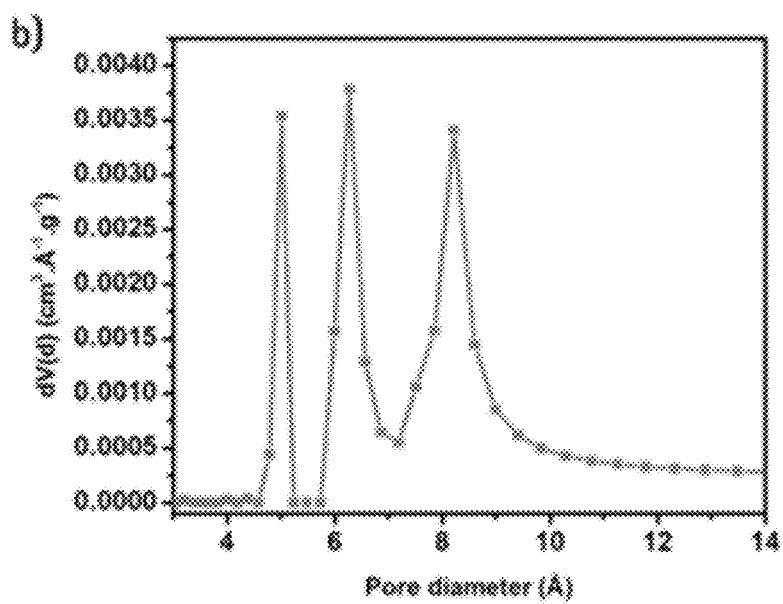
Figure 9A:
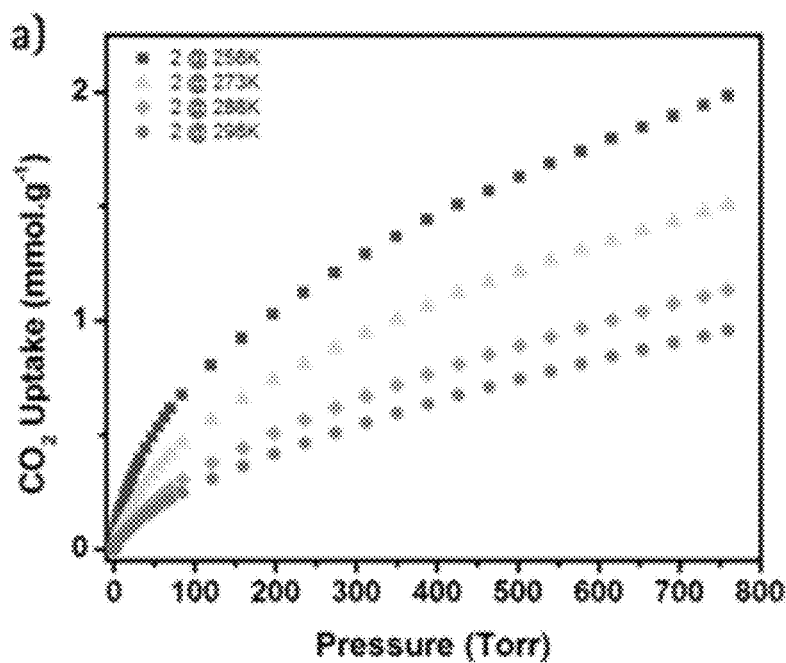
FIG. 9(a) shows variable temperature $CO_2$ adsorption isotherms for 2 and FIG. 9(b) shows pore size distribution for 2 calculated from the $CO_2$ sorption isotherm at 273K (NLDFT method, carbon adsorbent).
Figure 9B:
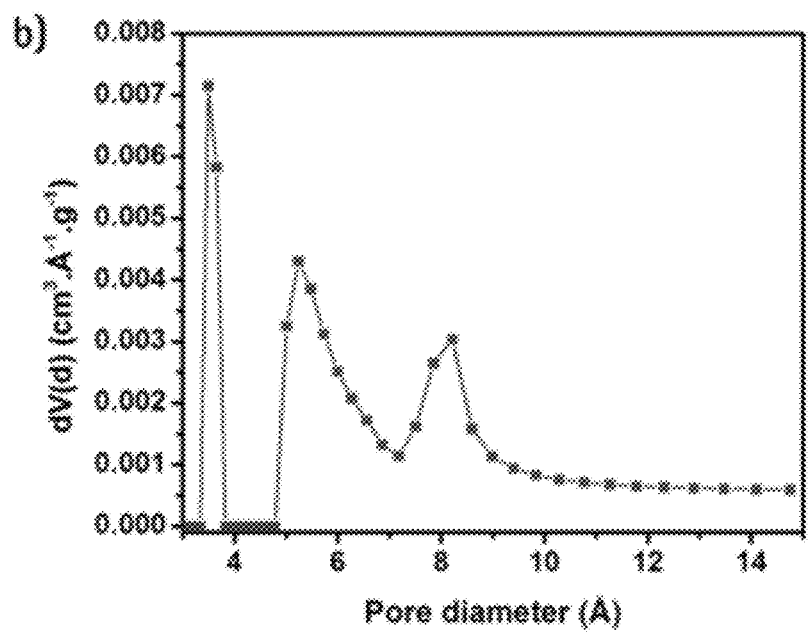

Nitrogen sorption performed on 2 at 77 K showed type IV isotherm with desorption hysteresis (FIG. 7(b)); BET, Langmuir surface areas and total pore volume being 485 m$^2$.g$^{-1}$, 525 m$^2$.g$^{-1}$ and 0.39 cm$^3$.g$^{-1}$, respectively. 2 still exhibits a suitable porosity, despite these values are ca. 25% lower than for 1, which is consistent with both the substitution of amines by a heavier group (15% of total molecular weight) and the pore diameter reduction induced by the amine grafting (FIG. 8(b), FIG. 9(b)).

Figure 10A:
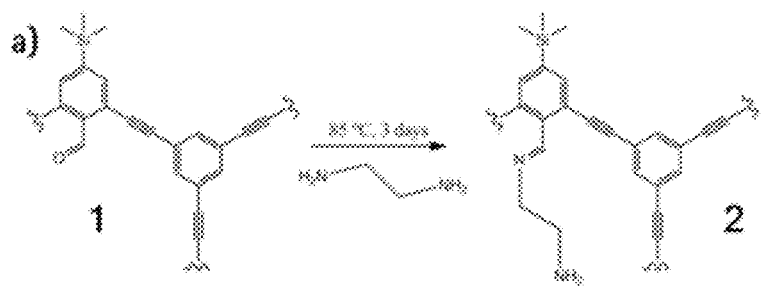
FIG. 10(a) shows an amine functionalization process of 1, FIG. 10(b) compares $CO_2$ uptake at low pressure in 1 and 2 (25° C.)
Figure 10B:
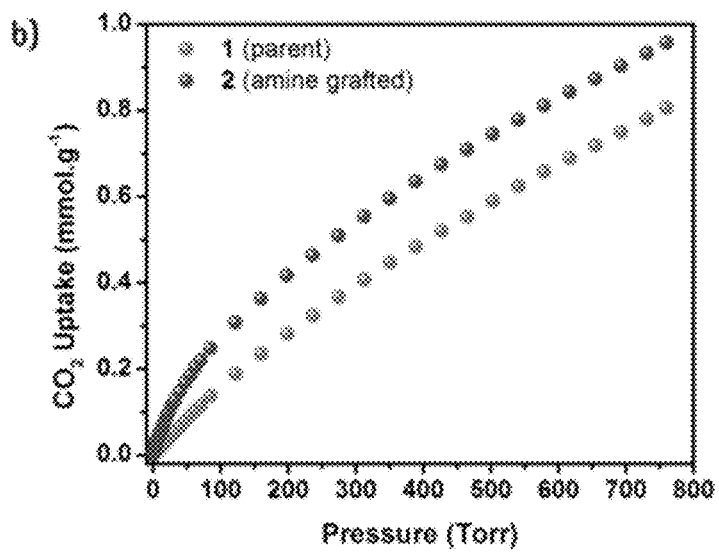
FIG. 10(c) shows isosteric heats of adsorption of $CO_2$ for 1 and 2.
Figure 10C:
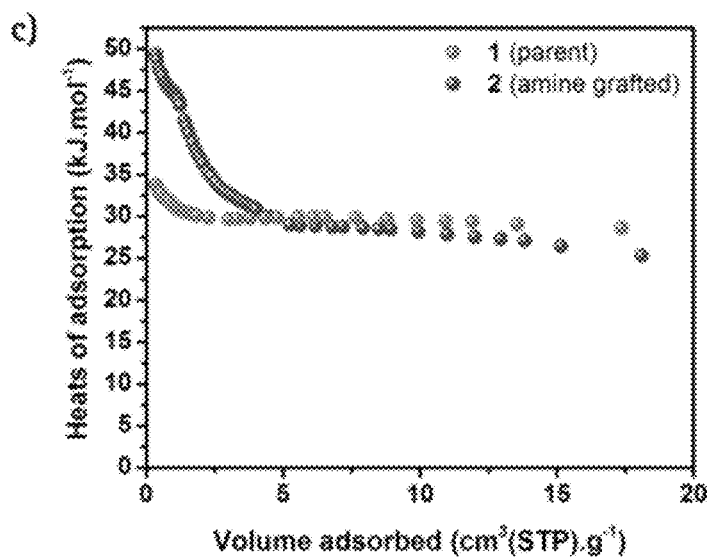

The isosteric heat (Qst) of $CO_2$ adsorption is a parameter that affects the affinity of the solid porous material toward $CO_2$, which in turn plays a role in determining the adsorption selectivity and the necessary energy to release the $CO_2$ during the regeneration step. FIG. 10(a) shows amine functionalization process; FIG. 10(b) compares $CO_2$ uptake at low pressure in 1 and 2; and FIG. 10(c) shows isosteric heats of adsorption of $CO_2$ for 1 and 2.

Figure 8A:
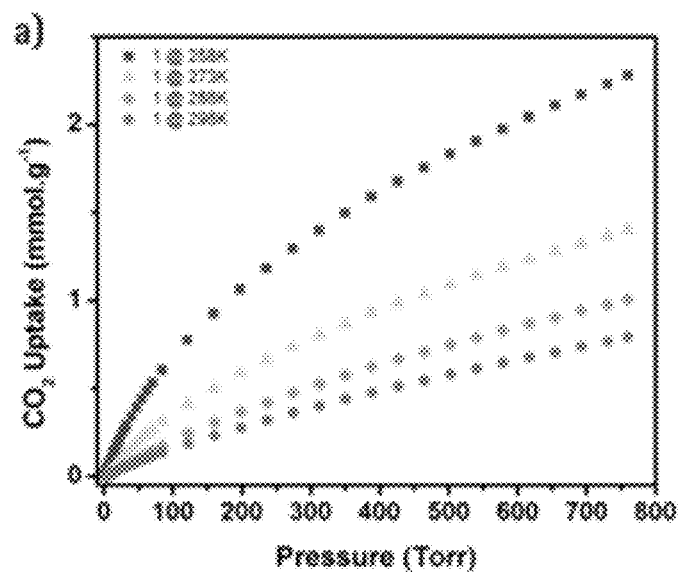
FIG. 8(a) shows variable temperature $CO_2$ adsorption isotherms for 1 and FIG. 8(b) shows pore size distribution for 1 calculated from the $CO_2$ sorption isotherm at 273K (NLDFT method, carbon adsorbent).

Investigation of $CO_2$ sorption properties for 1 and 2 at low pressures showed dramatic improvement after PSM. In one example, the isosteric heats of adsorption at low loading, determined from variable temperature isotherms at 258, 273, 288 and 298 K (FIG. 8(a), FIG. 9(a)) jumped from 33 kJ.mol$^{-1}$ for the plain POP (1) to 50 kJ.mol$^{-1}$ for amine functionalized POP (2), unambiguously probing the great efficiency of the amine grafting strategy on aldehyde nodes. Unlike usual amine supported materials, no heating was necessary to reactivate 2 between variable temperatures $CO_2$ adsorption runs, thus reducing the energy required for adsorption-desorption cycles. The $CO_2$ uptakes at 0.15 and 1 bar were 0.15 mmol.g$^{-1}$, 0.27 mmol.g$^{-1}$ and 0.78 mmol.g$^{-1}$ 0.95 mmol.g$^{-1}$ for 1 and 2 respectively.

Figure 11:
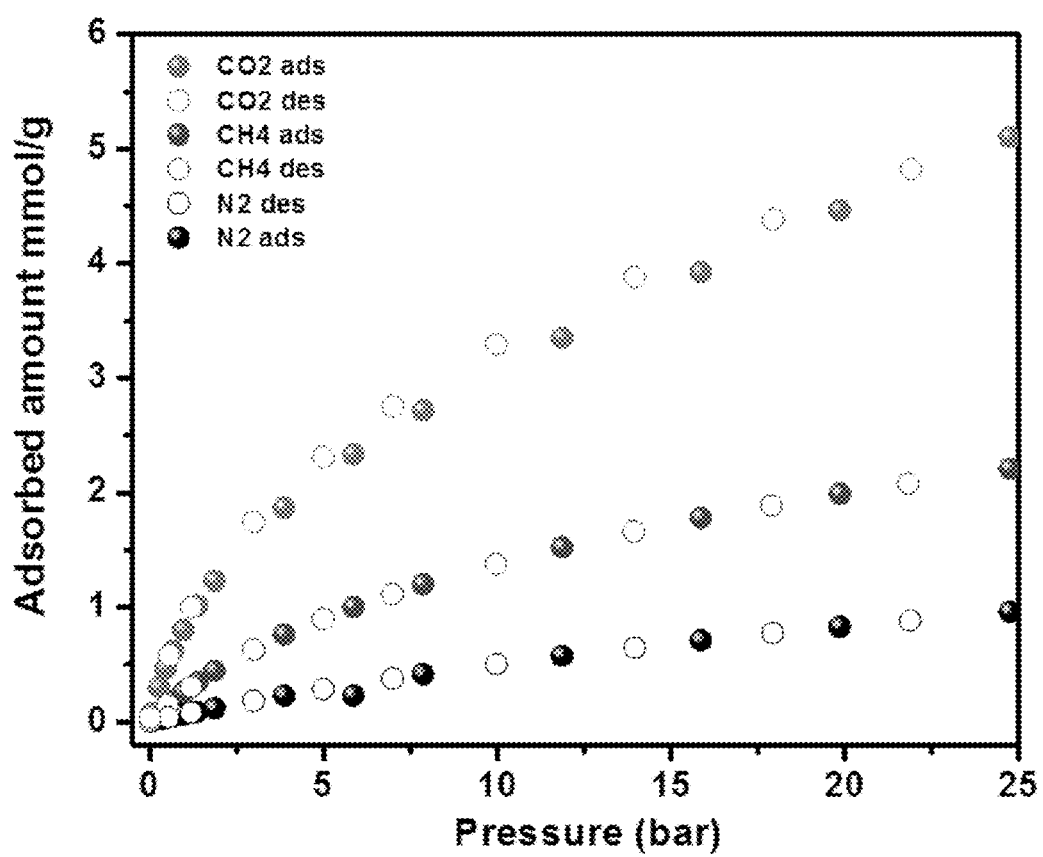
FIG. 11 shows adsorption of $CO_2$, $N_2$ and $CH_4$ on 1 at 298 K.
Figure 12:
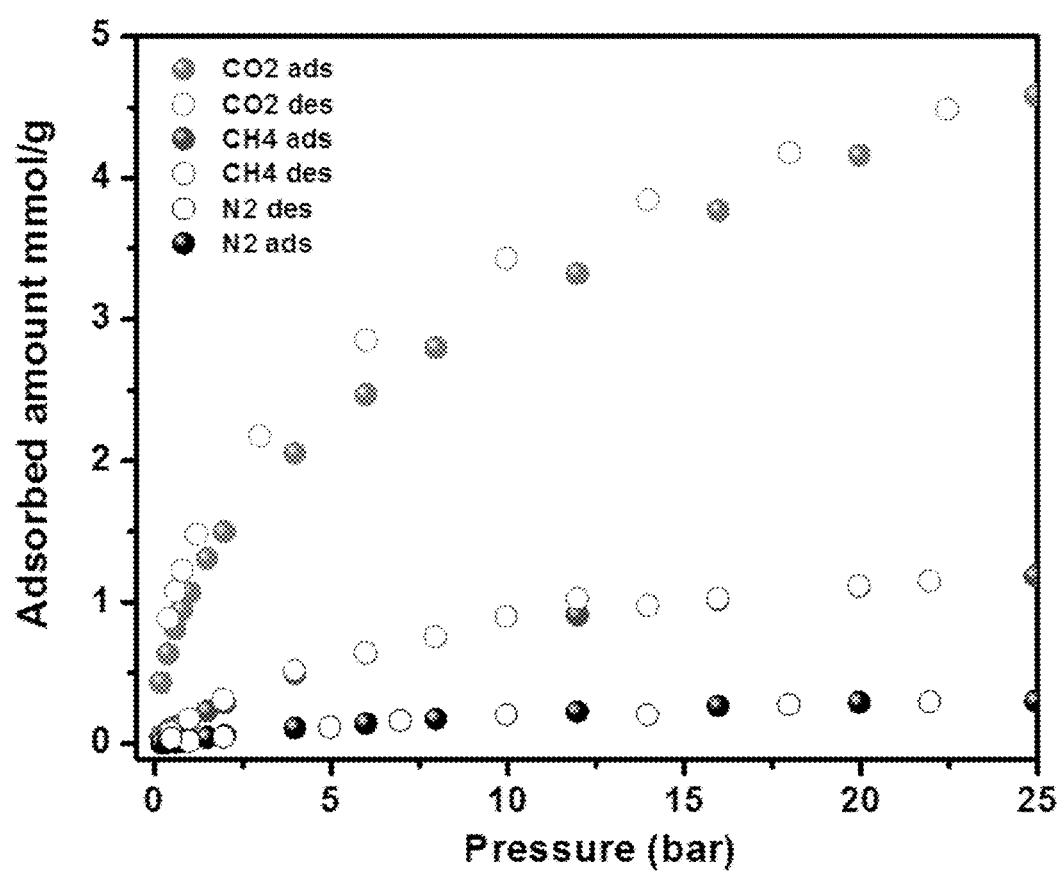
FIG. 12 shows adsorption of $CO_2$, $N_2$ and $CH_4$ on 2 at 298 K.
Figure 13:
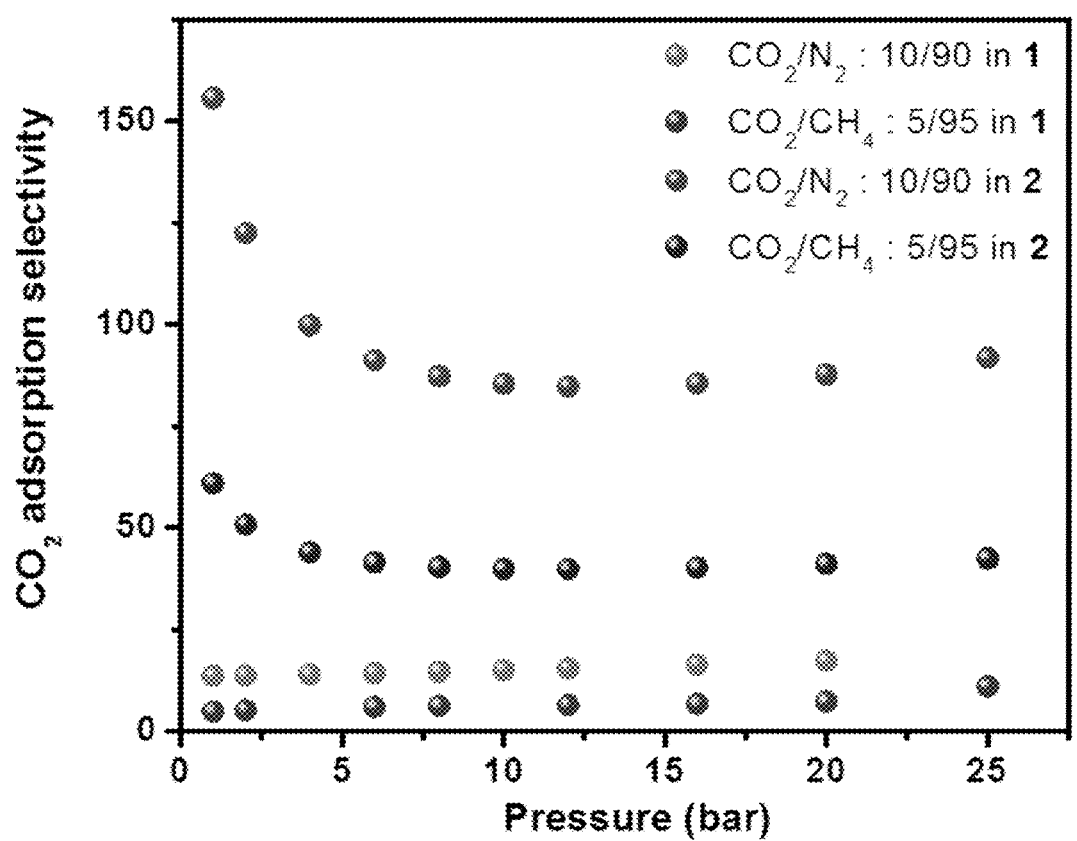
FIG. 13 shows $CO_2$ selectivity over $N_2$ and $CH_4$ in $CO_2/N_2$:10/90 and $CO_2/CH_4$ mixtures on 1 and 2.

Analysis of $CO_2$, $N_2$ and $CH_4$ adsorption at 298 K and wide range of pressure for 1 (FIGS. 11) and 2 (FIG. 12) using ideal adsorption solution theory (IAST, see ESI) showed that upon EDA grafting, the $CO_2$ selectivity, increased from 5 and 14 for the parent POP (1) to 60 and 155 for the amine functionalized POP (2) at 1 bar, in case of $CO_2/N_2$: 10/90 and $CO_2/CH_4$: 5/95 gas mixtures, respectively (FIG. 13). This finding is in agreement with the enhanced $CO_2$ energetics determined from the single gas, variable-temperature $CO_2$ adsorption. Although the heterogeneity of 1 and 2 may induce non-ideality, the purpose of the use of IAST is to show the enhancement in selectivity induced by the improved energetics at equilibrium. Table 1 shows comparison of CO2/N2 selectivity and Qst for CO2 in 1, 2 and some of the most promising POPs for CO2 capture.

| Sorbent | IAST $CO_2/N_2$ selectivity (1 bar, 298 K) | $CO_2Q_{st}$ (KJ mol$^{-1}$) | Ref. |
|---|---|---|---|
| 1 | 14[a] | 33 | This work |
| 2 | 155[a] | 50 | This work |
| COP-1 | 25[b] | — | 8a |
| Azo-COP-2 | 131[b] | 25 | 8b |
| PPN-6-CH$_2$EDA | 115[b] | 56 | 13 |
| PPN-6-CH$_2$DETA | 442[b] | 56 | 13 |
| FCFT-1-600 | 19[a]/152[a,c] | 32 | 8c |

[a]$CO_2/N_2$ = 10/90.
[b]$CO_2/N_2$ = 15/.85.
[c]Determined from breakthrough measurement.

Characterization of Amine Grafted Aldehyde-POP

Figure 14:
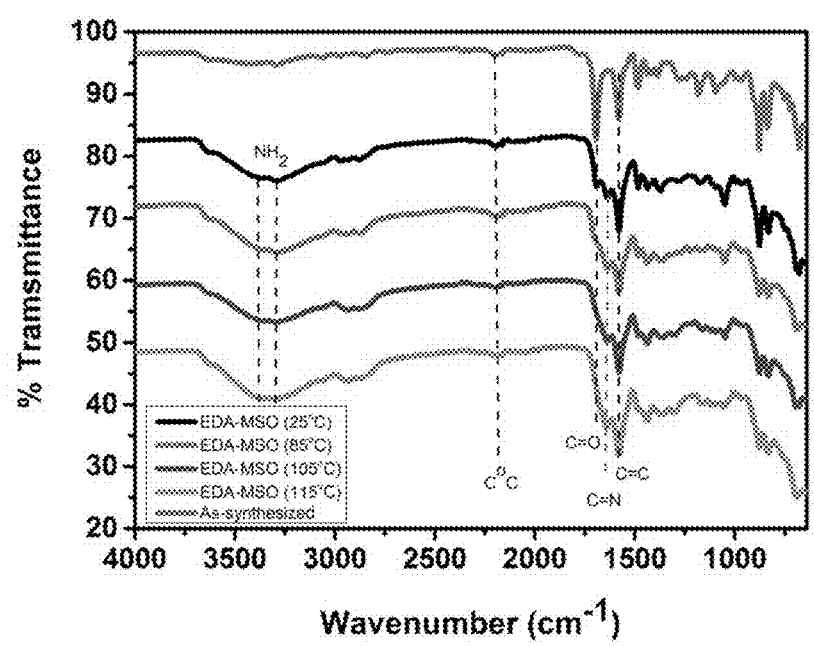
FIG. 14 shows IR spectra of EDA Aldehyde-POP.
Figure 15:
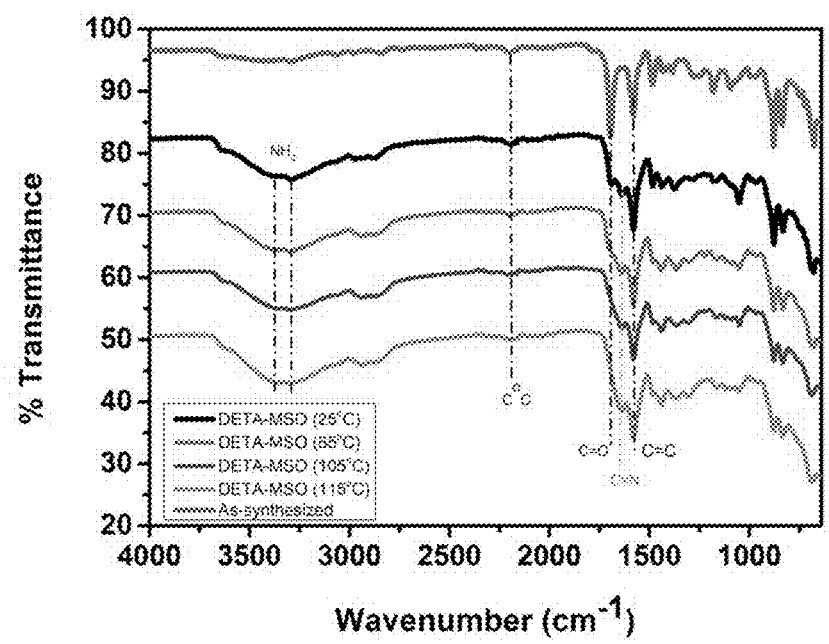
FIG. 15 shows IR spectra of DETA Aldehyde-POP.
Figure 16:
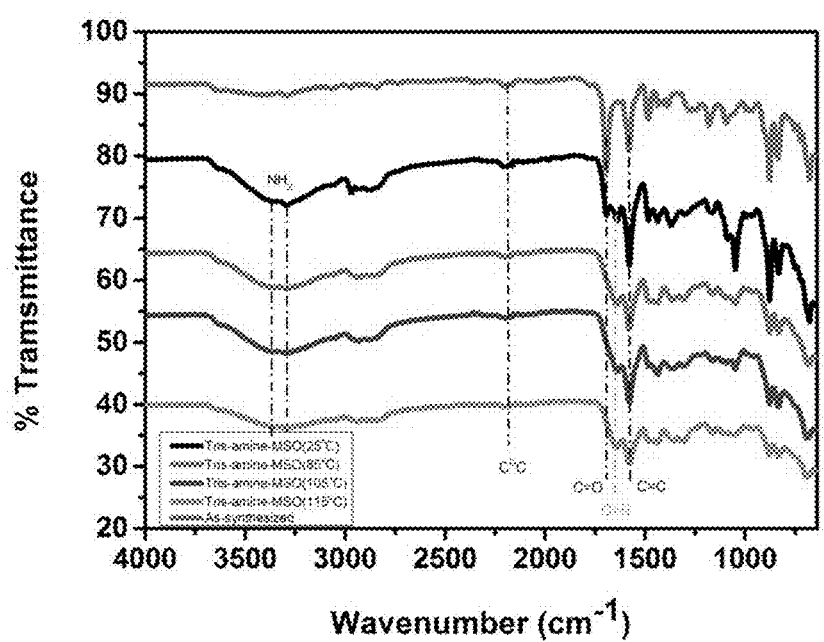
FIG. 16 shows IR spectra of Tris Aldehyde-POP.
Figure 17:
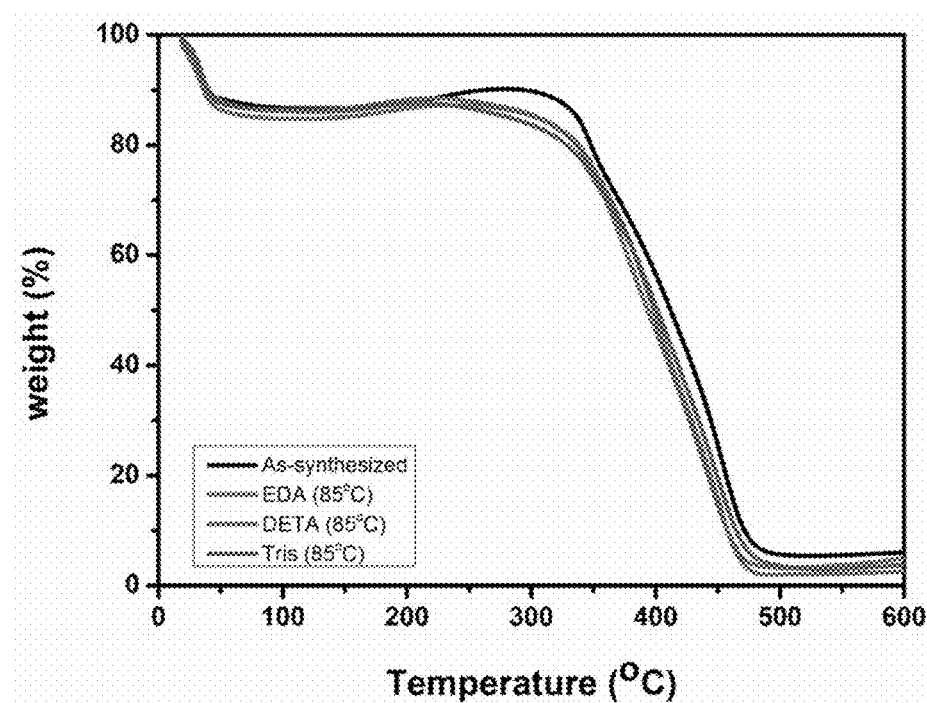
FIG. 17 shows TGA of amine grafting aldehyde-POP.

The grafting of amine into aldehyde-POP was confirmed by IR spectra. The infrared spectra of amine grafted aldehyde-POP with EDA (FIG. 14), DETA (FIG. 15), and Tris-amine (FIG. 16) show the appearance of some characteristic peaks as well as disappearance of others that were observed in the as-synthesized material. The peak of aldehyde function at 1690 cm$^{-1}$ in spectra at 105° C., and 115° C. disappears while this peak is present in spectra at 25° C. and 85° C., which indicates that the full conversion of aldehyde into imine moiety is achieved at 105, and 115° C. Additionally, the peak that appears in the amine-grafted network at 1640 cm$^{-1}$ characteristic of the C=N bond is not present in the as-synthesized POP and starting materials and thus confirms that aldehyde is substituted with amine. However, the significant OH broad band (3500-3000 cm$^{-1}$) suggests the presence of hydrogen bonding in the grafted materials and it is possible to assign two bands of $v_{N-H}$ (3354 and 3287 cm$^{-1}$). Finally, the vibration mode of alkyne at 2160 cm$^{-1}$ is present in all grafted materials, which indicates the structure does not collapse after grafting.

Thermogravimetric analysis of amine grafted aldehyde-POP shows a mass loss of approximately 10% below 30° C. corresponding to a loss of solvent. This mass loss suggests that the solvent/water have been coordinated to a free amine through hydrogen bonding. At higher temperature, up to 400° C., the structure starts to decompose. The amine-grafted materials have been dried at 50° C. for one-hour prior the measurement.

Figure 18:
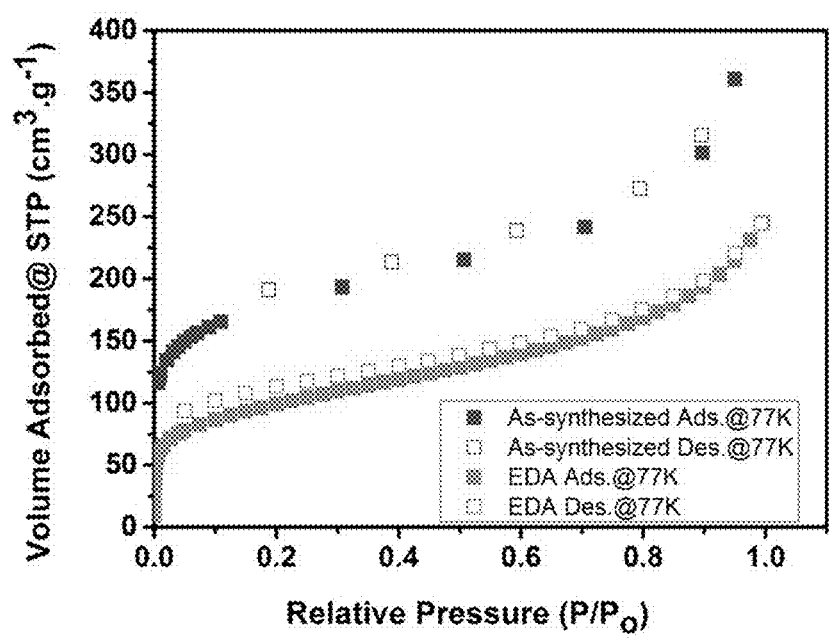
FIG. 18 shows nitrogen adsorption isotherm for as-synthesized aldehyde-POP (blue) and EDA aldehyde-POP (pink).
Figure 19:
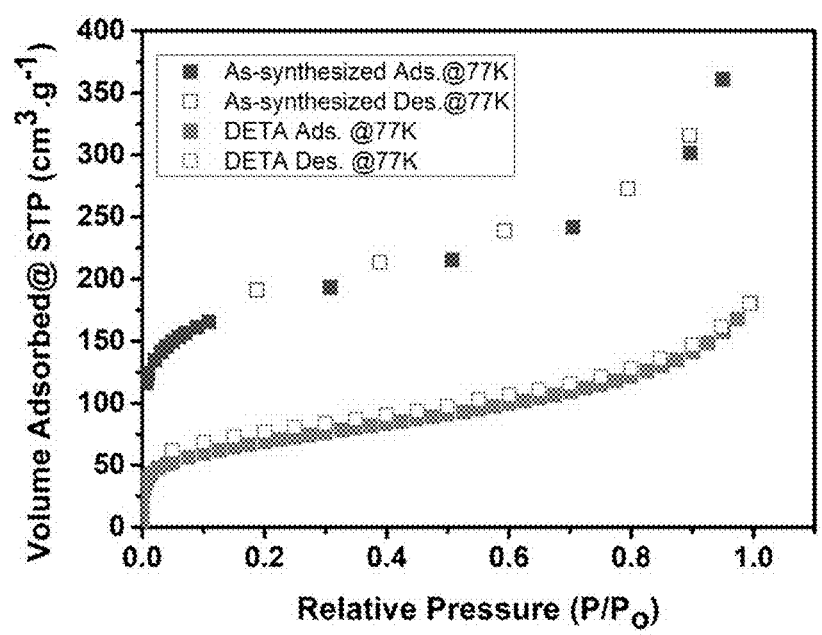
FIG. 19 shows nitrogen adsorption isotherm for as-synthesized ldehyde-POP (blue) and DETA aldehyde-POP (pink).

The presence of amine grafted into aldehyde-POP was further confirmed by nitrogen gas experiments (FIG. 18-19). These experiments showed similar type II like isotherm, which is similar to as-synthesized material. From the adsorption between the N— of amine groups with C— of the $CO_2$ since the shift of the peak lies in the amide/carbamic acid region (1700-1680 cm$^{-1}$). More significant changes are visible in the spectra of the region at higher wave number (2500-4000 cm$^{-1}$).

However, further analysis shows that these spectral changes that occur while introducing $CO_2$ disappears when sample is subjected to the vacuum, Indicating that the intermediate which was formed is unstable. Furthermore, the comparison of the spectra before introducing $CO_2$ with the one that was measured in the compound that was kept in the vacuum after introducing $CO_2$ shows that both has the same spectral pattern which can be overlaid on top of one on the other without having any differences. This gives an insight that the material remains unchanged in these two tests.

The main product of the reaction between $CO_2$ and amine is carbamate. See, for example, Sumida, K. et al., Chemical Reviews 2012, 112 (2), 724-81, which is incorporated by reference in its entirety. This reaction also leads to the formation of ammonium ions and bicarbonates. However, in the POPs that are studied here, it is clear that there is no evidence for any strong irreversible chemical reaction that could take place between $CO_2$ and amines. In both cases of DETA and Tris-amines, formation of unstable intermediary species was observed upon introduction of $CO_2$, which was reversible after applying vacuum. However, such intermediate was not observed in the case of EDA, which suggest the occurrence of a pure physisorption via weak Van Der Waals forces.

The higher uptake of $CO_2$ in the amine grafted materials results because of the formation of these intermediary species. Further, full reversibility of the adsorption and desorption cycles proves the instability of the intermediate that formed. Although this phenomenon were observed in lab scale under pure conditions, it is important to note that these interaction or observations could differ in real world conditions. For example, in a flu gas stream the interactions between —NH$_2$ and $CO_2$ may also be governed by the other factors such as electron acceptor species present in the system as impurities. Therefore, while studying the interactions between amines and $CO_2$ it is also advisable to study the interactions of the material with moisture, $SO_2$ or $H_2S$, etc. in order to develop materials with better performance on $CO_2$ capture.

The amine grafting can lead to a reduction of the surface area from 770 m$^2$g$^{-1}$ for parent material to 333 m$^2$g$^{-1}$, 162 m$^2$g$^{-1}$, 211 m$^2$g$^{-1}$ for DETA, EDA and Tris-amine. The interaction between $CO_2$ and the three different amine functionalized aldehyde-POP via in-situ IR showed a formation of unstable intermediary species.

Evidence for the presence amine grafted into aldehyde-POP was further confirmed by nitrogen gas experiments (FIGS. 18-19). These experiments showed similar type II like isotherm, which is similar to as-synthesized material. From the adsorption data, the BET surface areas were calculated to be 333 m$^2$.g$^{-1}$, 162 m$^2$.g$^{-1}$, and 211 m$^2$.g$^{-1}$ with total pore volume of 0.37, 0.28, 0.4 respectively in EDA, DETA, and Tris grafted POPs. These values are lower in comparison with as-synthesized material, which confirms the presence amine groups in the network of POPs.

Figure 20:
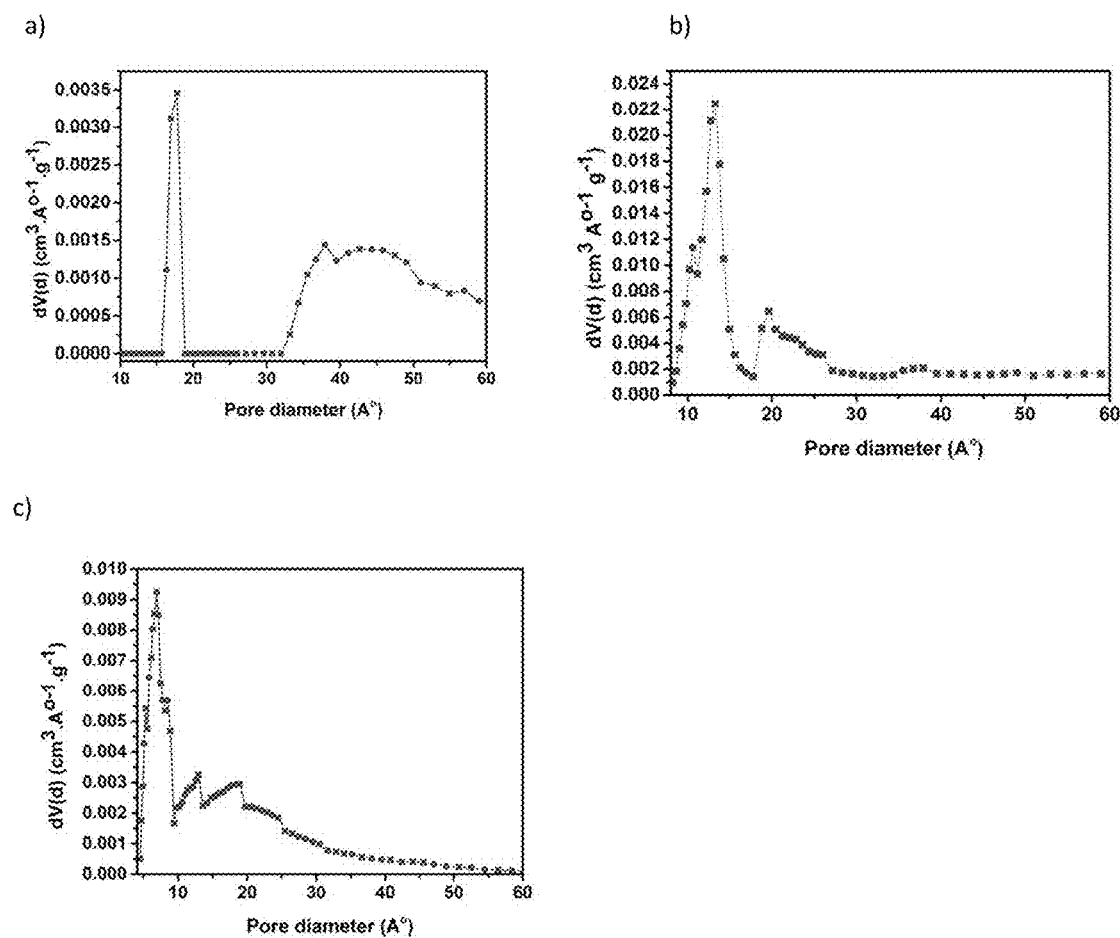
FIG. 20 shows pore distribution of a) aldehyde-POP b) EDA aldehyde-POP c) DETA aldehyde-POP.

In order to prove that amine was successfully grafted on aldehyde-POP, pore distribution was obtained using Carbon-slit shaped NLDFT pore model as shown in (FIG. 20). By comparing the pore diameter of aldehyde -POP and amine aldehyde-POP including (EDA and DETA), a shift in pore diameter is observed, which is expected because the amine chains are present inside the pore. Moreover, DETA aldehyde-POP pore diameter is lower than the EDA because of the bulkiness.

Figure 21:
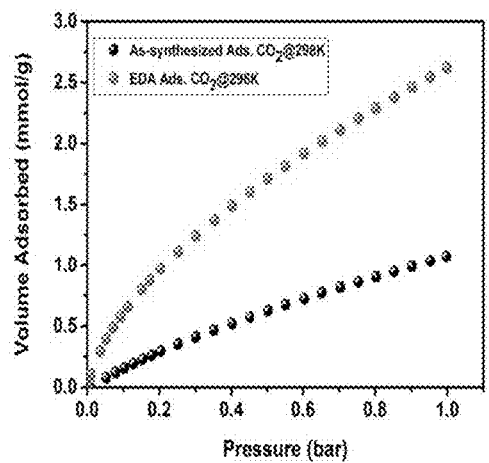
FIG. 21 shows $CO_2$ isotherm of aldehyde-POP with EDA aldehyde-POP (a), with DETA, aldehyde-POP(b), with Tris aldehyde-POP(c).
Figure 21:
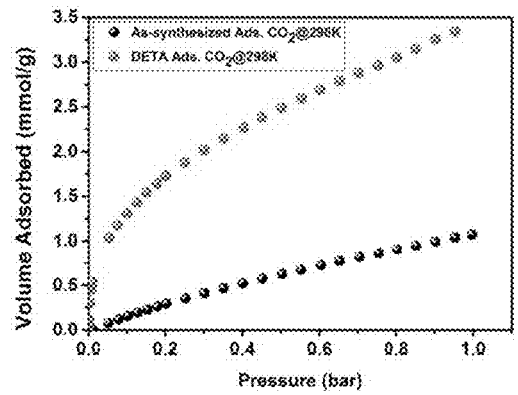
Figure 21:
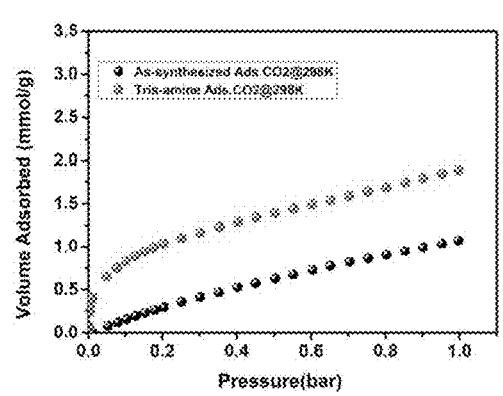
Figure 22:
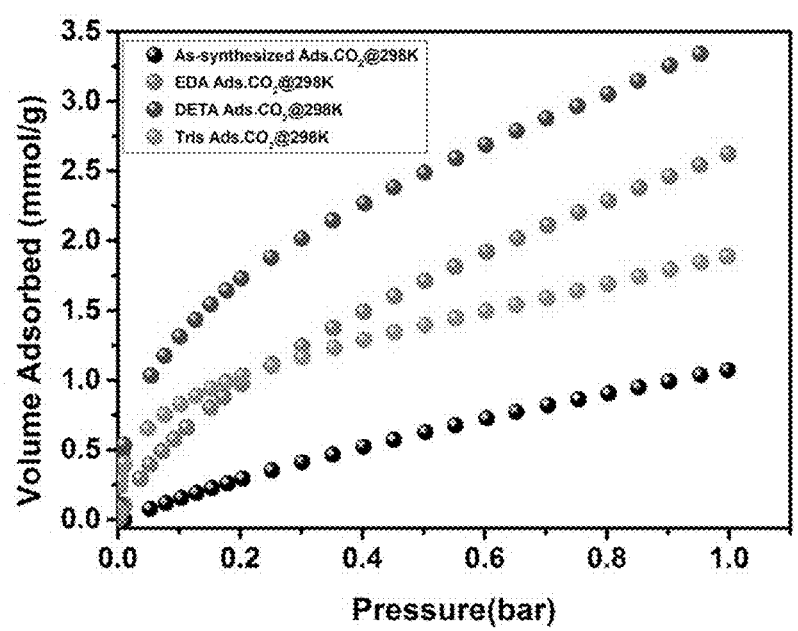
FIG. 22 shows $CO_2$ isotherm of as-synthesized aldehyde-POP(black) and amine grafted aldehyde-POP; EDA(red), DETA(blue), Tris-amine (pink).

FIG. 21 shows the $CO_2$ adsorption isotherms of the as-synthesized material as well as the grafted materials including: EDA-aldehyde POP, DETA-aldehyde POP, and Tris-amine aldehyde POP. In all cases, the $CO_2$ adsorption capacity for amine grafting materials is higher than for as-synthesized material. Accessibility of different amine chains in aldehyde-POP resulted in materials with reasonable good $CO_2$ adsorption characteristics at 295 K particularly at much lower pressure. Although the as-synthesized material has the highest surface area, it exhibits the lowest $CO_2$-uptake capacity (adsorbed (1 mmol/g) of $CO_2$ at 1 bar). This finding indicates that the $CO_2$ uptake capacity is not dependent only on surface area, but it is closely correlated to the amine functional group. The EDA and DETA aldehyde-POP isotherms show the same trend with $CO_2$ uptake capacity (3.5 mmol/g) at 1 bar while Tris amine aldehyde POP has lowest uptake of $CO_2$ (2 mmol/g) at the same pressure (FIG. 22).

Figure 23:
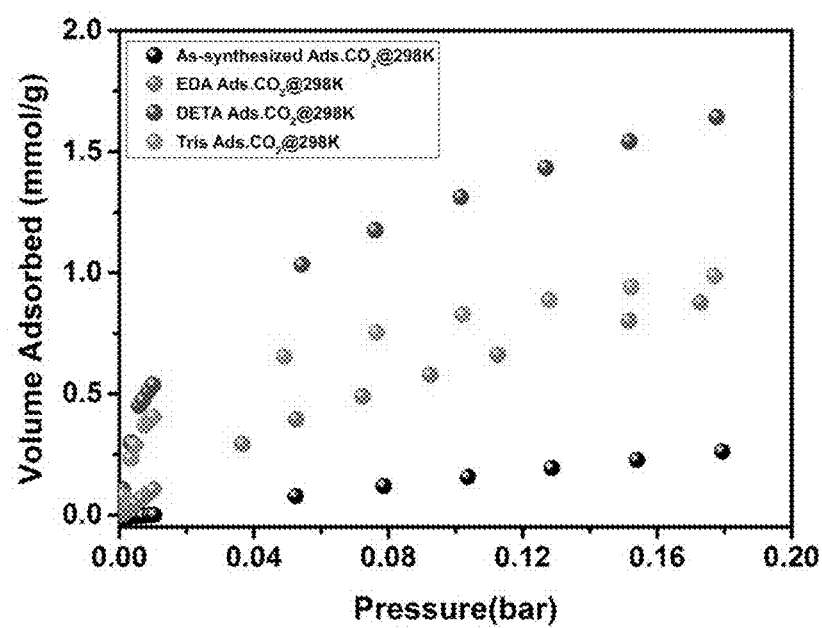
FIG. 23 shows $CO_2$ isotherms at low pressure of aldehyde-POP(black) and amine grafted aldehyde-POP; EDA (red), DETA(blue), Tris-amine(pink).

For post-combustion application, the partial pressure of $CO_2$ in flu gas is 0.15 bar. At 298 K and 0.15 bar (FIG. 23), Tris-amine aldehyde POP only takes 0.8 mmol/g of $CO_2$ whereas EDA and DETA aldehyde POP take about 1.5 mmol/g.

Figure 24:
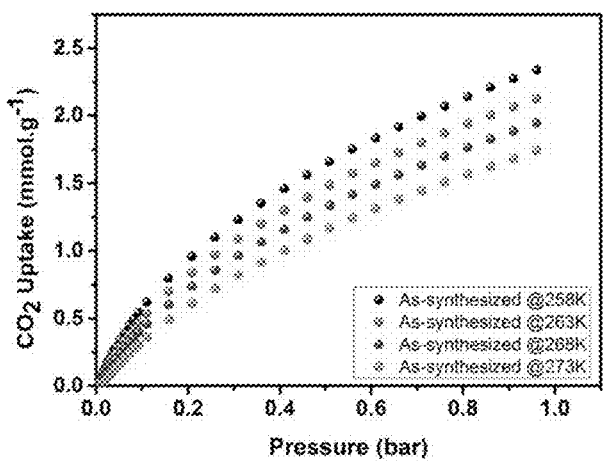
FIG. 24 shows variable temperature adsorption of Aldehyde-POP (a), DETA Aldehyde-POP (b), EDA Aldehyde-POP (c).
Figure 24:
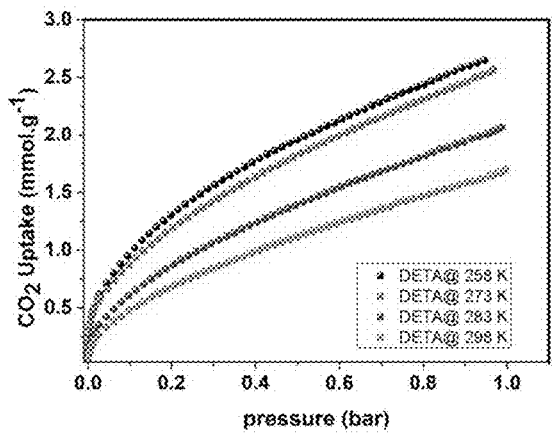
Figure 24:
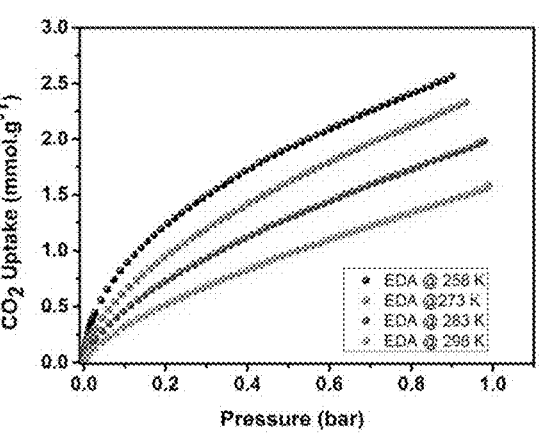
Figure 25:
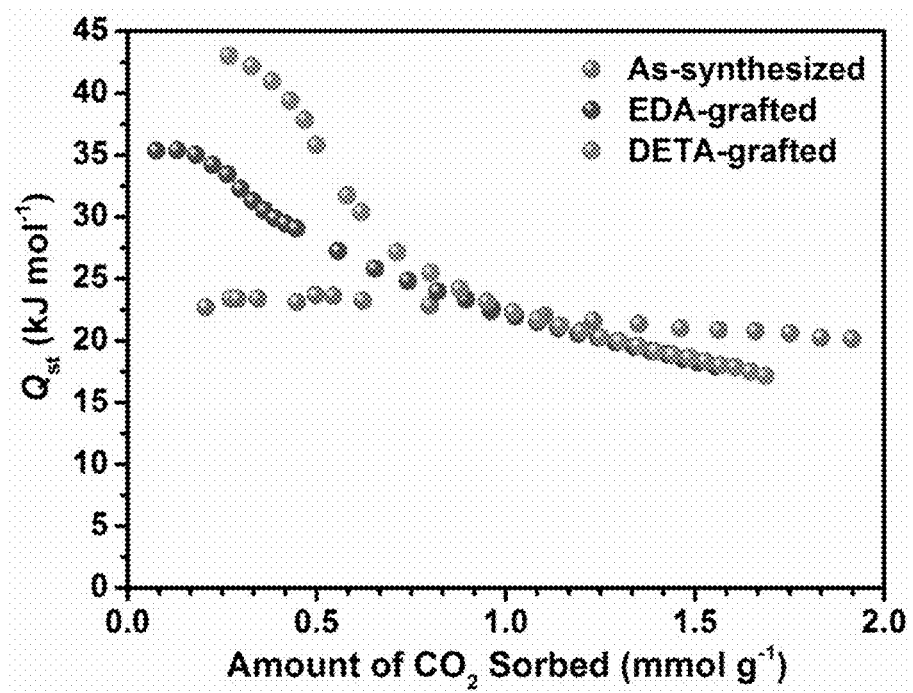
FIG. 25 shows isosteric heat of adsorption of $CO_2$ for as-synthesized aldehyde POP(green), EDA aldehyde-POP (blue), DETA aldehyde-POP(pink).

As-synthesized aldehyde POP isotherms were recorded at 258, 263, 268, and 273K. Similarly, EDA-aldehyde POP and DETA-aldehyde POP isotherms were recorded at 258, 268, 273, and 298 K in order to evaluate the isosteric heat of adsorption (Qst). FIG. 24 shows the isotherm at these different temperatures while in FIG. 25, the Qst is plotted as a function of $CO_2$ loading. The Qst for DETA-aldehyde POP is highest (around 45 kJ/mol) at low coverage.

Although studies have been performed studies on understanding interactions and mechanistic investigating the $CO_2$ uptake on solid amine sorbents such as amine functionalized/grafted MOFs or COFs are scarce. See, for example, Zhu, Y. et al., Chemistry of Materials 2013, 25 (9), 1630-1635; Lu, W. et al., Journal of the American Chemical Society 2011, 133 (45), 18126-18129; Lu, W. et al., Angewandte Chemie 2012, 51 (30), 7480-4; Chen, C. et al., Materials Letters 2013, 106, 344-347; Choi, S. et al., The Journal of Physical Chemistry Letters 2012, 3 (9), 1136-1141; Kim, M. et al., CrystEngComm 2012, 14 (12), 4096; emessence A. et al., Journal of American Chemical Society 2009, 131, 8784-8786; Couck, S. et al., Journal of American Society 2009, 131, 6326-6327; Moellmer, J. et al., Microporous and Mesoporous Materials 2010, 129 (3), 345-353, each of which is incorporated by reference in its entirety. The amine functional groups of solid sorbents usually interact with $CO_2$ via acid-base interactions where $CO_2$ acts as acidic species and amine groups as basic sites, allowing a reversible adsorption of $CO_2$ with the material in the operating conditions. In situ IR is a tool that can be used to understand these interactions while performing the adsorption experiments. This study presents the outcome of the amine —$CO_2$ interactions with 3 different amine functionalized POPs (EDA, DETA and Tris amine) which has been performed in multiple cycles of $CO_2$ capture under the constant monitoring with in situ IR.

Figure 7:
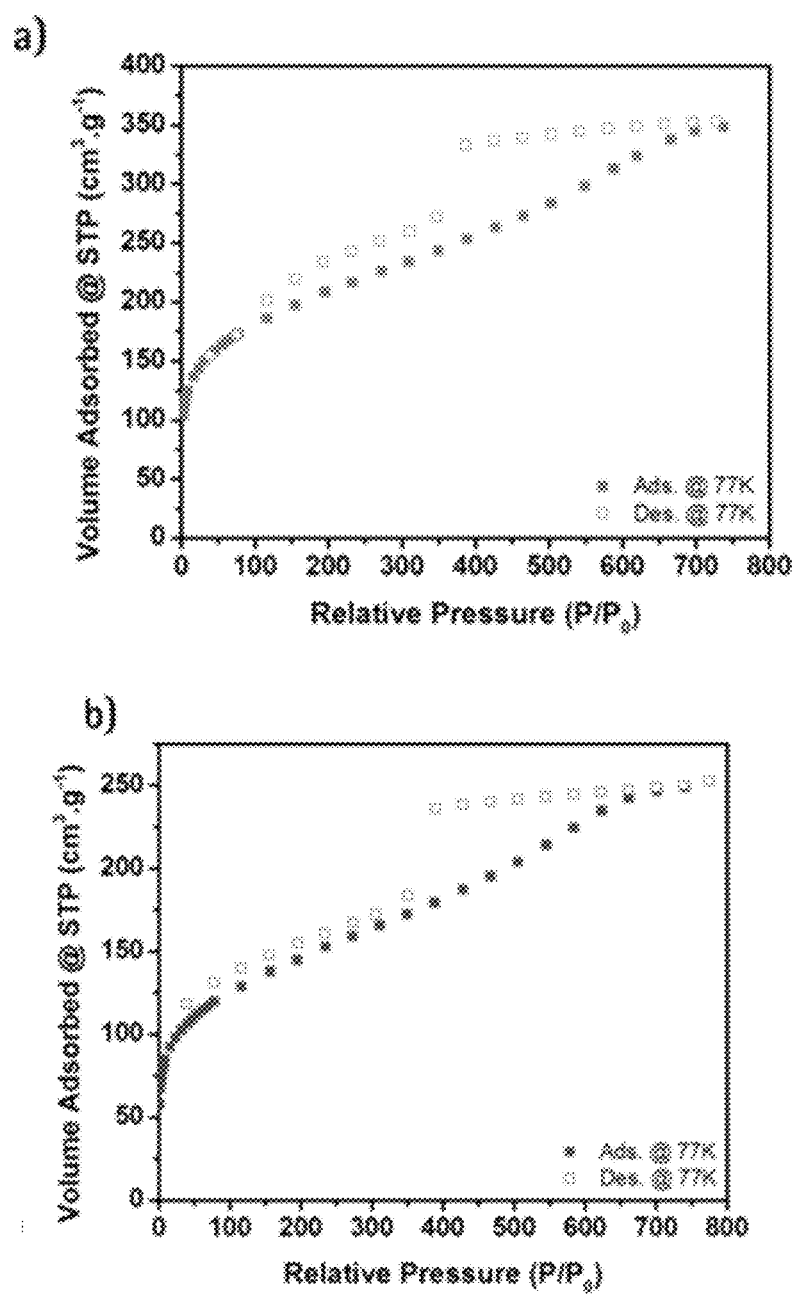
FIG. 7 shows Nitrogen sorption isotherms at 77 K for a) 1 and b) 2.
Figure 26:
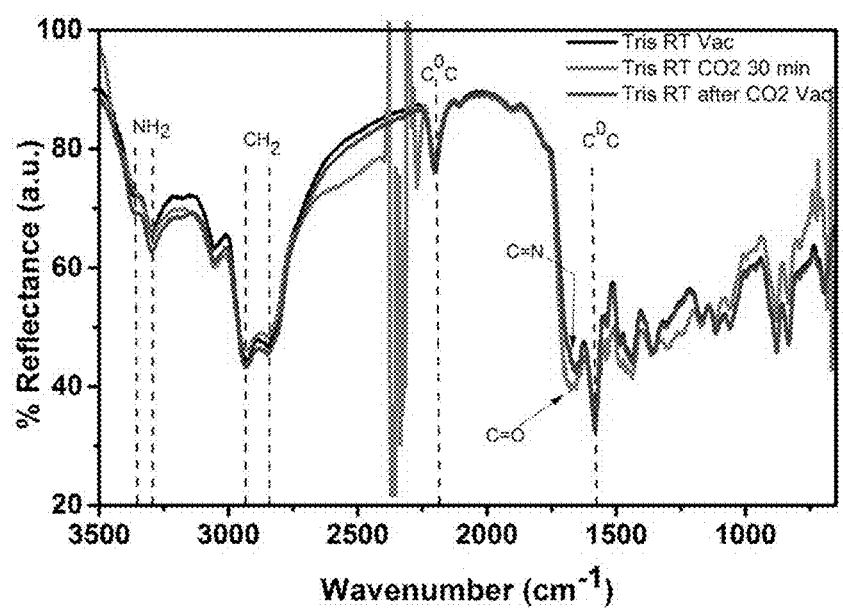
FIG. 26 shows in-situ IR spectrum of Tris-amine Aldehyde-POP.
Figure 27:
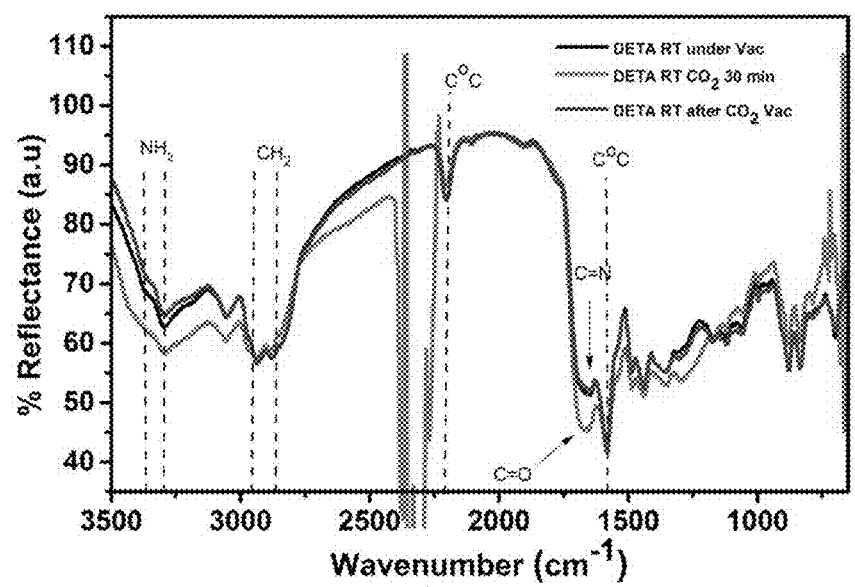
FIG. 27 shows in-situ IR spectrum of DETA Aldehyde-POP.

The IR absorbance spectra of Tris-amine and DETA at room temperature revealed that the accumulation of the strongly adsorbed $CO_2$ may lead to a formation of unstable intermediary species (FIGS. 26 & 7. The comparison of spectra before introducing $CO_2$ with the one that was measured while introducing $CO_2$ shows subtle but significant changes. The intensity of the IR peak at 1660 $cm^{-1}$ increases while introducing $CO_2$, a shift of the spectral position is observed from 1660 to 1680 $cm^{-1}$. This shows the formation of an intermediary species. Although the intermediate that formed was not clearly identified it is evident that the interactions have been occurred.

Other embodiments are within the scope of the following claims.

What is claimed is:

1. A method of tuning a porous network, the method comprising functionalizing a molecular building block of a porous network with at least one amine, wherein the porous network includes one or more of {[(C2)3-C6H3]2[(CH3)3Si—C6H2-CHO]3}n, where n is greater than one.

2. The method of claim 1, wherein the porous network includes a metal-organic framework.

3. The method of claim 1, wherein the porous network includes a porous organic polymer.

4. The method of claim 1, further comprising introducing an aldehyde group to the molecular building block.

5. The method of claim 1, wherein functionalizing the molecular building block of the porous network includes substituting an aldehyde group with an amine, leading to an imine bond.

6. The method of claim 1, wherein the amine includes at least a primary amine, a secondary amine, a tertiary amine, or a mixture thereof.

7. The method of claim 1, wherein the functionalized porous network includes {[(C2)3-C6H3]2[(CH3)3Si—C6H2-CHNC2H4NH2]3}n, where n is greater than one.

8. The method of claim 1, wherein the functionalizing porous network adsorbs more gas after amine functionalization.

9. The method of claim 1, wherein the CO2 selectivity of the porous network over other gases increases after amine functionalization.

10. The method of claim 9, wherein the CO2 selectivity of the porous network over one or more of N2 and CO2 increases after amine functionalization.

11. The method of claim 1, further comprising soaking or grafting the porous network in a solution containing the amine.

12. A method of tuning a porous network, the method comprising functionalizing a molecular building block of a porous network with at least one amine, wherein the functionalized porous network may be characterized by the formula {[(C2)3-C6H3]2[(CH3)3Si—C6H2RCHR']3}n, where n is greater than one and R is nothing or an alkyl and R' is a moiety containing at least one primary, secondary, tertiary amine, or polyamine that is bonded to R via an imine bond.

13. The method of claim 12, wherein the porous network includes a metal-organic framework.

14. The method of claim 12, wherein the porous network includes a porous organic polymer.

15. The method of claim 12, wherein the amine comprises a polyamine.

16. The method of claim 12, wherein enhancing gas affinity comprises enhancing CO2 selectivity.

17. The method of claim 12, wherein enhancing gas affinity comprises enhancing CO2 selectivity over one or more of CH4 and N2.

18. The method of claim 1, wherein the amine includes a polyamine.

19. The method of claim 1, wherein functionalizing the molecular building block of the porous network includes introducing an aldehyde group to the molecular building block and subsequently functionalizing the introduced aldehyde group with the amine.

20. The method of claim 12, wherein functionalizing the molecular building block of the porous network includes introducing an aldehyde group to the molecular building block and subsequently functionalizing the introduced aldehyde group with the amine.

* * * * *